(12) United States Patent
Qi et al.

(10) Patent No.: US 11,960,675 B2
(45) Date of Patent: Apr. 16, 2024

(54) DISPLAY APPARATUS

(71) Applicant: HISENSE VISUAL TECHNOLOGY CO., LTD., Shandong (CN)

(72) Inventors: Dongxin Qi, Shandong (CN); Aichen Xu, Shandong (CN); Ying Chen, Shandong (CN); Caixia Zhao, Shandong (CN); Yuxin Zhang, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 17/964,287

(22) Filed: Oct. 12, 2022

(65) Prior Publication Data

US 2023/0030106 A1    Feb. 2, 2023

Related U.S. Application Data

(63) Continuation of application No. PCT/CN2021/086973, filed on Apr. 13, 2021.

(30) Foreign Application Priority Data

Apr. 13, 2020  (CN) .......................... 202010284493.1
May 14, 2020   (CN) .......................... 202010405771.4
(Continued)

(51) Int. Cl.
*G06F 3/041*    (2006.01)
*F21V 8/00*     (2006.01)
*G02F 1/1333*   (2006.01)

(52) U.S. Cl.
CPC ......... *G06F 3/0416* (2013.01); *G02B 6/0055* (2013.01); *G02F 1/13338* (2013.01); *G02F 1/13332* (2021.01)

(58) Field of Classification Search
None
See application file for complete search history.

(56) References Cited

U.S. PATENT DOCUMENTS

| 2016/0313834 | A1  | 10/2016 | Ma et al. |
| 2017/0031504 | A1* | 2/2017  | Hwang ................. G06F 3/0488 |
| 2020/0133068 | A1* | 4/2020  | Lu ........................ G02B 6/0073 |

FOREIGN PATENT DOCUMENTS

| CN | 1700270 A   | 11/2005 |
| CN | 106155404 A | 11/2016 |

(Continued)

OTHER PUBLICATIONS

Office Action issued for Chinese Application No. 202010284493.1 dated Feb. 23, 2023.

*Primary Examiner* — Stephen T. Reed
(74) *Attorney, Agent, or Firm* — Meunier Carlin & Curfman LLC

(57) ABSTRACT

The application provides a display apparatus. The display apparatus includes: a touch panel, configured to receive a touch operation and comprising a touch film and a display panel configured to display an image; a backlight module configured to provide a backlight source to the touch panel and including a backplane, a reflective sheet, a light guide plate, an optical film and a light source located on one side of the backplane; a touch pad, configured to drive and control the touch film; and a plurality of flexible circuit boards, through which the touch film is electrically connected with the touch pad, and which are located on a same side of the touch film.

13 Claims, 16 Drawing Sheets

(30) Foreign Application Priority Data

May 14, 2020 (CN) .......................... 202010405923.0
Dec. 30, 2020 (CN) .......................... 202011628031.3

(56) References Cited

FOREIGN PATENT DOCUMENTS

| | | | |
|---|---|---|---|
| CN | 106775429 | A | 5/2017 |
| CN | 107193166 | A | 9/2017 |
| CN | 107436705 | A | 12/2017 |
| CN | 107992218 | A | 5/2018 |
| CN | 108132745 | A | 6/2018 |
| CN | 109032494 | A | 12/2018 |
| CN | 109213388 | A | 1/2019 |
| CN | 109917959 | A | 6/2019 |
| CN | 209373557 | U | 9/2019 |
| CN | 110389684 | A | 10/2019 |
| CN | 110750173 | A | 2/2020 |
| JP | 2014035603 | A | 2/2014 |
| KR | 20200001709 | A | 1/2020 |

\* cited by examiner

DISPLAY APPARATUS

CROSS-REFERENCE OF RELATED APPLICATIONS

The application is a continuation application of International Application No. PCT/CN2021/086973 filed on Apr. 13, 2021, which claims the priorities from Chinese Patent Applications No. 202010284493.1 filed on Apr. 13, 2020, No. 202010405771.4 filed on May 14, 2020, No. 202010405923.0 filed on May 14, 2020, and No. 202011628031.3 filed on Dec. 30, 2020, which are hereby incorporated by reference in their entireties.

TECHNICAL FIELD

The disclosure relates to touch display technologies, and in particular, to a display apparatus.

BACKGROUND

With the continuous development of human-computer interaction requirements, more and more touch films have been applied to various display products. However, the application progress in TV products is relatively slow, mainly due to being subject to panel manufacturers, which still cannot achieve the volume output of touch panels in large size.

At present, some commercial TVs can realize touch function. Generally, the structure shown in FIG. 1 is adopted, including: a touch film, a Flexible Printed Circuit (FPC) and a touch panel that includes a driving circuit. In this structure, the FPC protrudes from three sides of the touch film, so the TV set in this structure needs a relatively large bezel to cover the FPC, resulting in a larger frame of the TV set.

SUMMARY

A display apparatus in the disclosure includes a touch film on one side of a display panel, where the touch film is connected with a touch pad through a plurality of flexible circuit boards which are located on a same side of the touch film. The flexible circuit boards are located on the same side, which can reduce the frame size of the touch display apparatus and looks more pleasing. In some embodiments, the touch film includes a plurality of sensing lines and a plurality of driving lines.

In some embodiments, the plurality of flexible circuit boards include one or more first flexible circuit boards and one or more second flexible circuit boards.

In some embodiments of the disclosure, the plurality of driving lines are connected with the touch pad through the one or more first flexible circuit boards; the plurality of sensing lines are connected with the touch pad through the one or more second flexible circuit boards; and the one or more first flexible circuit boards and the one or more second flexible circuit boards are located on the same side of the touch film.

In some embodiments of the disclosure, one side of the display panel is connected with a plurality of third flexible circuit boards, and the plurality of third flexible circuit boards of the display panel and the one or more first and second flexible circuit boards of the touch film are located on the same side of the display panel. The flexible circuit boards of the display panel and the flexible circuit boards of the touch film are arranged on the same side of the display panel.

In some embodiments of the disclosure, the plurality of third flexible circuit boards of the display panel and the one or more first and second flexible circuit boards of the touch film are arranged alternatively to avoid friction between the flexible circuit boards in upper and lower layers.

In some embodiments of the disclosure, the one or more first and second flexible circuit boards of the touch film are located at the ground-side of the display panel.

In some embodiments of the disclosure, the display apparatus further includes an adapter board, through which one or more of the flexible circuit boards of the touch film is/are electrically connected with the touch pad, so as to adapt to the placement position of the touch pad and facilitate the assembly of the display apparatus.

In some embodiments of the disclosure, the display apparatus further includes a flexible flat cable, through which the connection between the touch pad and the adapter board is realized.

In some embodiments of the disclosure, the number of the one or more second flexible circuit boards is greater than the number of the one or more first flexible circuit boards, so as to ensure the touch precision.

In some embodiments of the disclosure, the display apparatus further includes: a front housing, located at a ground-side of the display panel and configured to cover a plurality of flexible circuit boards at the ground-side of the display panel.

In some embodiments of the disclosure, the plurality of driving lines are connected with the first flexible circuit board by bonding; and the plurality of sensing lines are connected with the second flexible circuit board by bonding.

The first flexible circuit board FPC is connected with the touch pad by bonding; and the second flexible circuit board FPC is connected with the touch pad by bonding, so as to achieve the tight connection between components and achieve the good electrical connection between components.

In some embodiments of the disclosure, the plurality of sensing lines and the plurality of driving lines are arranged on a first area of the touch film and a second area of the touch film different from the first area, the density of the plurality of sensing lines and the plurality of driving lines in the first area is greater than the density of the plurality of sensing lines and the plurality of driving lines in the second area.

In some embodiments of the disclosure, the width of the first area is equal to the width of the touch film and the width of the second area is equal to the width of the touch film.

In some embodiments of the disclosure, the touch film comprises a viewing area and an active area. A black matrix is disposed between the viewing area and the active area.

DETAILED DESCRIPTION

The embodiments of the disclosure will be described clearly and completely below in combination with the accompanying drawings in the embodiments of the disclosure. Obviously the described embodiments are only a part of the embodiments of the disclosure but not all the embodiments. Based upon the embodiments of the disclosure, all of other embodiments obtained by those ordinary skilled in the art without creative work fall within the protection scope of the disclosure.

In the description of the disclosure, it should be understood that the orientation or position relationship indicated by the terms "center", "upper", "lower", "front", "rear", "left", "right", "vertical", "horizontal", "top", "bottom", "inner", "outer", etc. is the orientation or position relationship shown based on the drawings, and is only for the purpose of facilitating the description of the disclosure and simplifying the description, rather than indicating or implying that the device or element referred to must have a particular orientation or be constructed and operate in a particular orientation, and thus should not be construed as the limitation on the disclosure.

In some embodiments of the disclosure, the display apparatus may be a liquid crystal display, which includes a backlight, a liquid crystal panel and a driving circuit. The liquid crystal panel itself does not emit light, but relies on the light provided by a backlight source to achieve the brightness display.

The imaging principle of the liquid crystal display is: liquid crystal molecules are aligned between two pieces of conductive glass, and the alignment of the crystals can be changed due to the variable electric field that runs through them created by the two electrodes, so as to control the transmission or shielding function of the light from backlight source and thereby display the image. If a color filter is added, color images can be displayed.

Figure 2A:
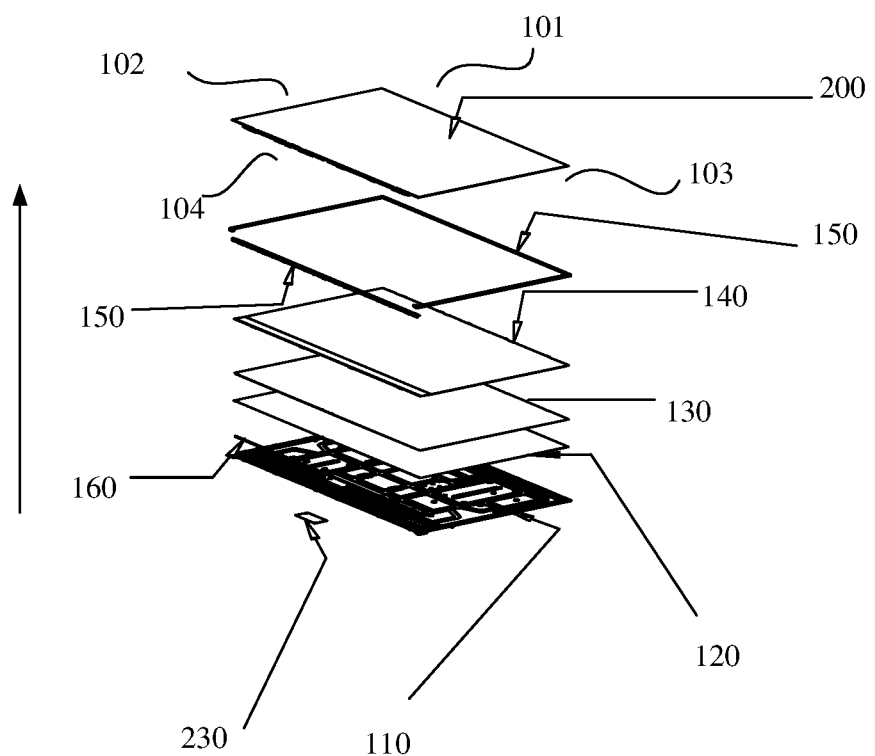
FIG. 2A is an exploded view of a display apparatus according to some embodiments of the disclosure.

FIG. 2A is an exploded view of a display apparatus according to some embodiments of the disclosure.

Referring to FIG. 2A, the display apparatus includes a backlight module and a touch panel 200, where the backlight module is configured to provide a backlight source to the touch panel.

Along the light-emitting direction of the display apparatus, the backlight module includes a backplane 110, a reflective sheet 120, a light guide plate 130, an optical film 140, a middle frame 150, and a light source 160 located on one side of the backplane 110 in order.

In some embodiments, the light source 160 is configured to produce light, and the light source 160 is located on the ground side of the display apparatus.

In some embodiments, the light source 160 is provided in the form of a light bar, including a circuit board and a plurality of LEDs on the circuit board, where the light emitted from the light source 160 reaches reflective sheet from one side.

In some embodiments, the optical film 140 is located on the light emergent side of the light guide plate 130 to brighten the light.

The optical film 140 may include one or more films, including at least one of a prism film and a brightness enhancement film.

In some embodiments, the light guide plate 130 includes a light incident side and a light emergent side, and the light source 160 is located on the light incident side of the light guide plate 130. The light entering from the light incident side is emitted, after the refraction and total reflection of the light guide plate 130, from the light emergent side, thereby converting the line light source into a surface light source. The light emergent side is the direction shown by the arrow in FIG. 2A.

In some embodiments, the reflective sheet 120 is located on the opposite side to the light emergent side of the light guide plate 130. The reflection sheet 120 is configured to guide the light into the light-emitting direction, facilitating the uniform distribution of the light emitted by the light source. The reflection sheet 120 is fixed on the surface of the backplane 110.

Figure 2B:
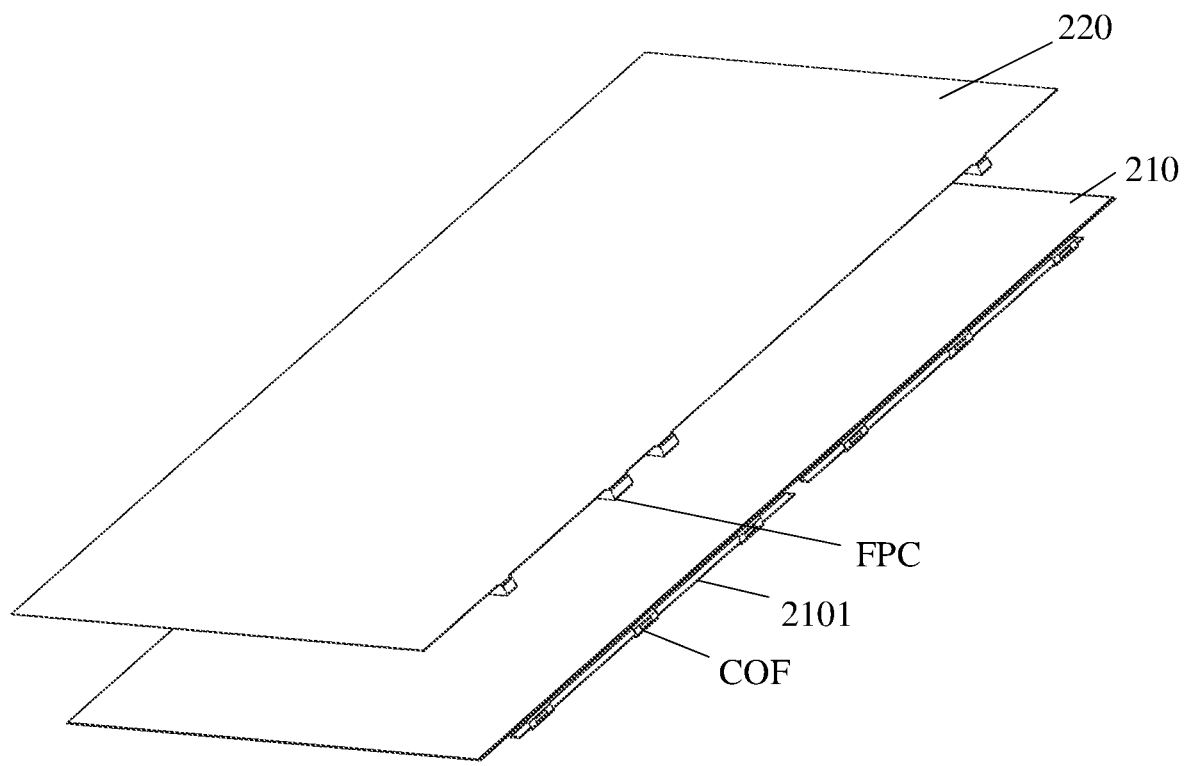
FIG. 2B is an exploded view of a touch panel according to some embodiments of the disclosure.

As shown in FIG. 2B, the touch panel 200 includes a touch film 220 and a display panel 210. The display panel 210 is configured to display an image, and includes a display area and a circuit board located on one side of the display area, where the drive and display of the entire display panel is realized through the circuit board.

Here, the FPC connected with the touch film 220 is configured to connect with a touch pad 230, and the Chip On Flex (COF) connected with the display panel 210 is configured to connect with a source board 2101.

The touch pad 230 is a driving circuit board for the touch film.

As shown in FIG. 2A, the display apparatus includes a sky side 101, a right side 103, a left side 102 and a ground side 104, where the sky side 101 is opposite to the ground side 104, the left side 102 is opposite to the right side 103, the sky side 101 is connected with one end of the left side 102 and one end of the right side 103 respectively, and the ground side 104 is connected with the other end of the left side 102 and the other end of the right side 103 respectively.

The disclosure is mainly directed to a display apparatus with a touch panel, and the structure, function, and implementation of the display apparatus will be firstly described in detail below.

The trend of home TV is to make the bezel as narrow as possible. Generally, only a front housing is arranged on the ground side (i.e., the lower side) to cover the driving circuit of the display panel, and the upper, left and right sides are generally designed with no bezel. Therefore, the architecture of the touch film in FIG. 1 cannot be applied to the above-mentioned home TV, so there is a need to adjust the architecture of the touch film.

In the display apparatus of embodiments of the disclosure, the FPC connected with the electrode lines of the touch film can be designed to be located on one side of the touch film, such as the ground side of the display panel. This configuration can make the bezel of the display apparatus narrower and more beautiful, and the user experience is better.

The display apparatus of embodiments of the disclosure can be applied to a television, a computer display, etc.

The embodiments of the disclosure will be described in detail below with specific examples. Several specific embodiments below can be combined with each other, and the same or similar elements or processes may be omitted in some embodiments.

Figure 3:
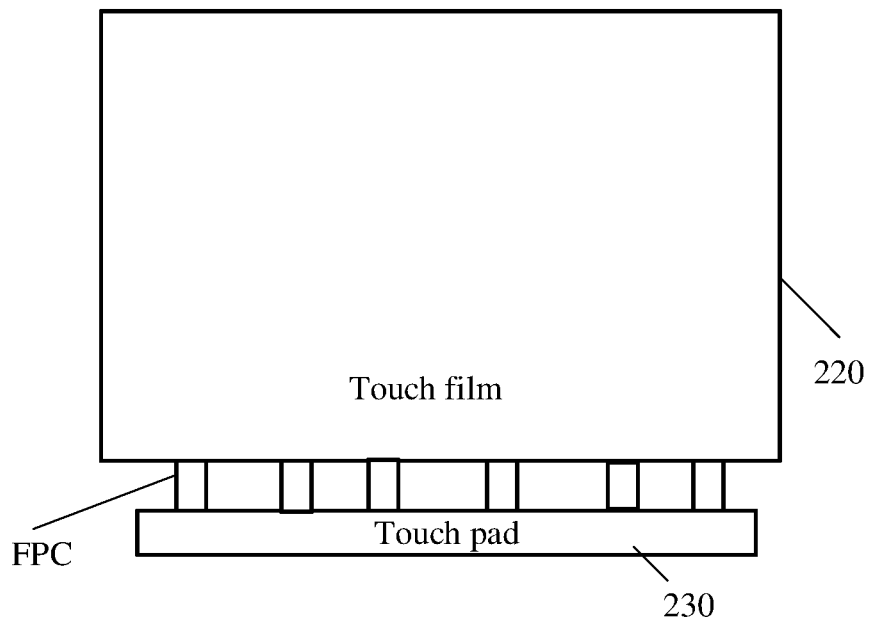
FIG. 3 is a schematic diagram of the architecture of a touch control according to some embodiments of the disclosure.

FIG. 3 is a schematic diagram of a touch control architecture according to some embodiments of the disclosure. As shown in FIG. 2A, FIG. 2B and FIG. 3, the display apparatus of this embodiment includes:
- a touch panel 200, including a touch film 220 and a display panel 210 and configured to receive a touch operation,
- a touch pad 230, configured to drive and control the touch film 220;
- a plurality of flexible circuit boards (FPCs), through which the touch film 220 is electrically connected with the touch pad 230, and which are located on a same side of the touch film 220.

Figure 1:
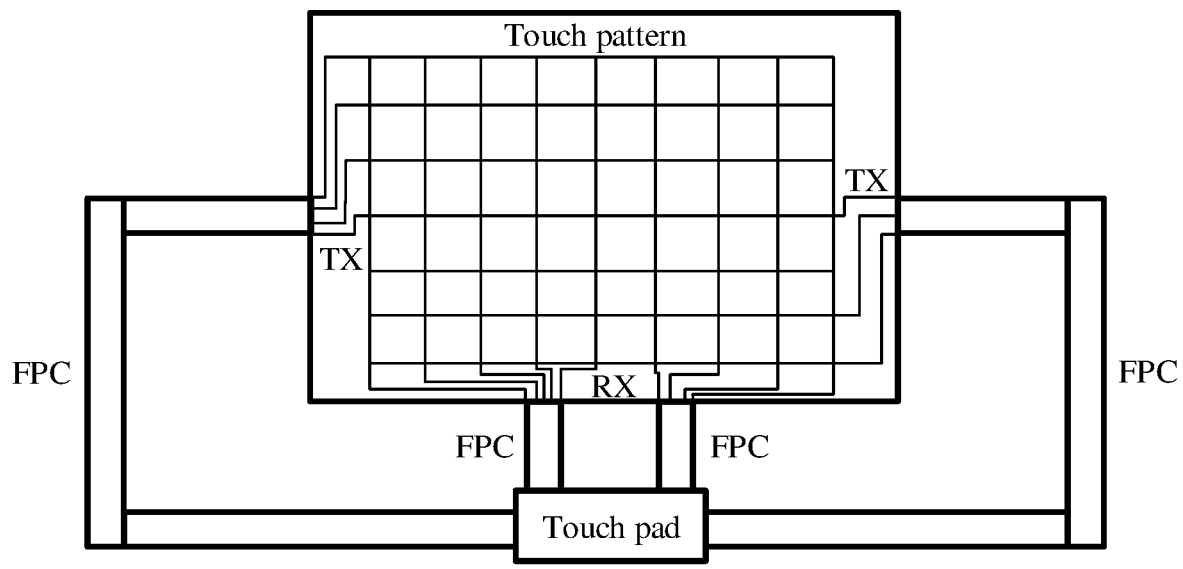
FIG. 1 is an architecture schematic diagram of a touch film in the related art.

In FIG. 3, the plurality of FPCs are located on the same side of the touch film 220, so a front housing needs to be arranged on only one side to shield the circuit boards such as the FPCs and the touch pad 230, reducing the frame requirement compared with the architecture of FIG. 1.

The display apparatus of this embodiment includes the touch film on one side of the display panel, where the touch film is connected with the touch pad through a plurality of flexible circuit boards which are located on the same side of the touch film. The flexible circuit boards are located on the same side, which can reduce the frame requirement of the touch display apparatus and looks more pleasing.

In some embodiments, the touch film includes a plurality of sensing lines and a plurality of driving lines.

The plurality of flexible circuit boards (FPCs) include: a first flexible circuit board (hereinafter referred to as first FPC) 240, through which the plurality of driving lines are electrically connected with the touch pad;

a second flexible circuit board (hereinafter referred to as second FPC) 250, through which the plurality of sensing lines are electrically connected with the touch pad.

The first FPC 240 and the second FPC 250 are located on the same side of the touch film.

The FPCs at the left and right sides in FIG. 3 both may be the first FPCs, or the first FPCs are located at one side, which is not limited in the embodiment of the disclosure.

The number of first FPCs and the number of second FPCs can be adjusted according to needs, for example, according to the width of the Black Matrix (BM) area.

One purpose of the BM area is to cover the existence of lines such as the sensing line RX and the driving line TX. The BM area is located between the Viewing Area (VA) and the Active Area (AA) of the touch film.

Figure 4:
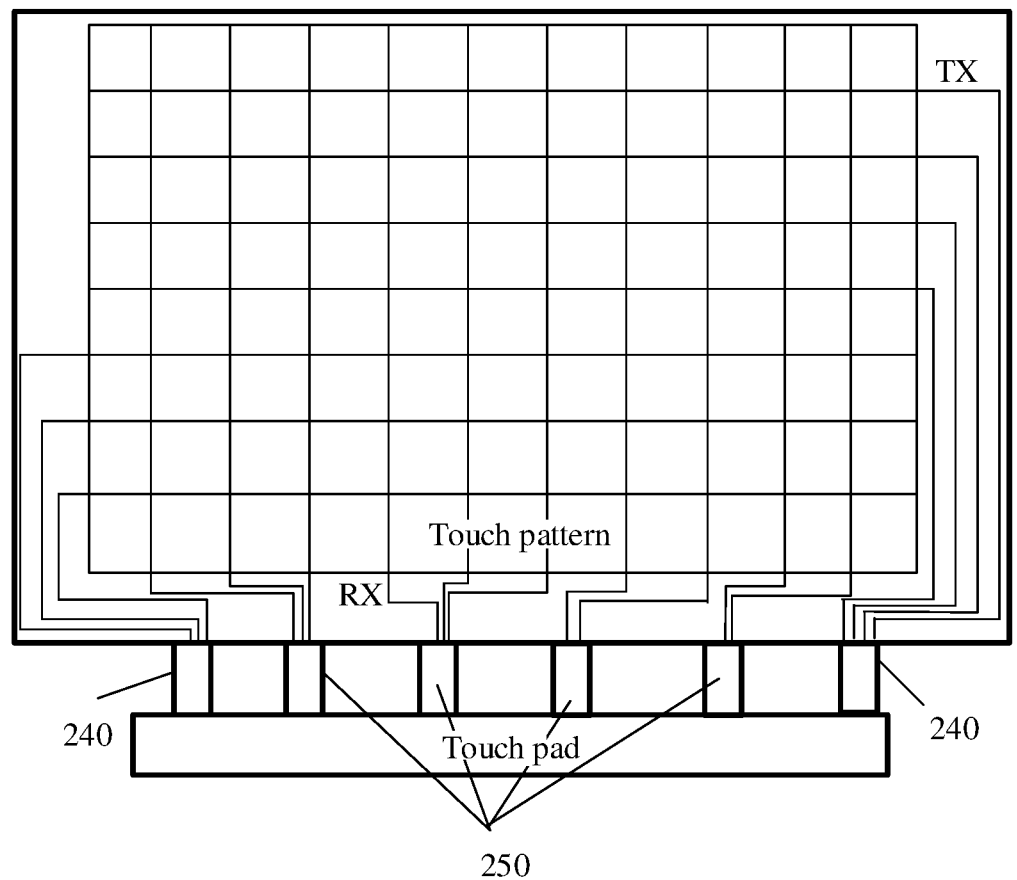
FIG. 4 is a schematic diagram of a touch line pattern according to some embodiments of the disclosure.

FIG. 4 shows a schematic diagram of a touch line pattern. In FIG. 4, the lines in horizontal direction denote the driving lines TX, and the lines in the vertical direction denote the sensing lines RX.

The number of driving lines TX and sensing lines RX in FIG. 4 is only an example. In order to improve the touch accuracy, the number of driving lines TX and sensing lines RX can be increased, that is, the density of driving lines TX and sensing lines RX is increased, while the distance between adjacent driving lines TX and the distance between adjacent sensing lines RX are reduced.

In some embodiments, the number of sensing lines RX is greater than the number of driving lines TX to ensure the touch precision. Further, for example, the number of sensing lines RX is twice the number of driving lines TX.

The increase in the number of driving lines TX and sensing lines RX may lead to an increase in the width of the BM. For example, increasing the number of electrode lines without changing the spacing of the electrode lines in the BM area will increase the width of the BM, or increasing the number of electrode lines while reducing the spacing of the electrode lines in the BM area has the higher requirement for the manufacturing process and may not be realized, so the setting may be performed according to needs.

In some embodiments, by arranging the first FPC connecting the plurality of driving lines with the touch pad and the second FPC connecting the plurality of sensing lines with the touch pad on the same side of the touch film, the bezel of the display apparatus can be reduced and looks more pleasing.

In some embodiments, one side of the display panel is connected with a plurality of third flexible circuit boards which are located on a same side of the display panel as the first flexible circuit board and the second flexible circuit board, where the first flexible circuit board, the second flexible circuit board and the third flexible circuit boards are arranged alternatively.

In some embodiments, as shown in FIG. 2B, the display apparatus further includes a source board 2101 configured to drive and control the display panel.

The third flexible circuit boards (COFs) are connected with the source board 2101.

Here, the third flexible circuit boards extend beyond the source board 2101.

One side of the display panel is connected with a plurality of flexible circuit boards, and the flexible circuit boards of the display panel and the flexible circuit boards of the touch film are located on the same side of the display panel. The flexible circuit boards of the display panel and the flexible circuit boards of the touch film are arranged on the same side of the display panel. In this way, the same component can be used to achieve full shielding and can be used on only one side, facilitating the frameless design of the other three sides without significant change on the basis of the original home TV set.

In some embodiments of the disclosure, the flexible circuit boards of the display panel and the flexible circuit boards of the touch film are arranged alternatively to avoid friction between the flexible circuit boards in upper and lower layers.

In some embodiments of the disclosure, the flexible circuit boards of the touch film are located at the ground-side terminal of the display panel, obtaining the home touch TV structure without changing the original structure significantly.

Figure 5:
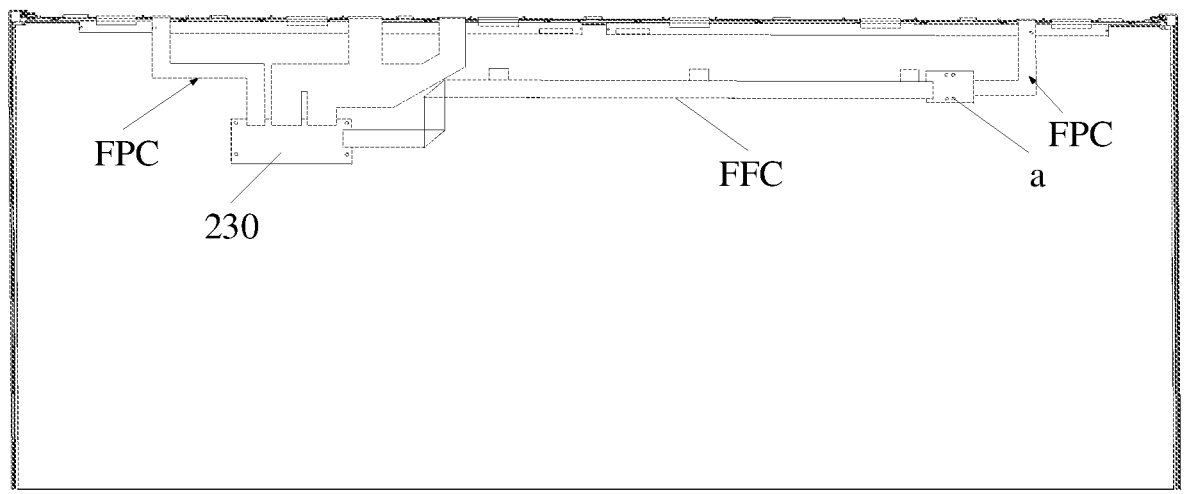
FIG. 5 is a structural schematic diagram of a display apparatus according to some embodiments of the disclosure.

In some embodiments, as shown in FIG. 5, the first FPC and the second FPC are bent to the back of the display apparatus to reduce the width of the outer frame on the ground side of the display apparatus, so as to facilitate the amount, fixation and reception of the touch pad 230.

In some embodiments of the disclosure, the display apparatus further includes an adapter board, through which one or more of the flexible circuit boards of the touch film is/are electrically connected with the touch pad, so as to adapt to the placement position of the touch pad and facilitate the assembly of the display apparatus.

In some embodiments of the disclosure, the display apparatus further includes a Flexible Flat Cable (FFC), through which the connection between the touch pad and the adapter board is realized.

In some embodiments, the first FPC and the second FPC in FIG. 5 are connected with the touch pad 230. If the touch pad is not large enough, or in order to avoid the placement positions of other circuit boards in the home TV set, the touch pad is often not placed in the middle position. When the touch pad is placed in a non-middle part, that is, close to an end of the display apparatus, the FPC located at the edge relative to the touch pad is connected with the FPC through the adapter board a to forward to the touch pad 230.

If the FPC is designed with a length to allow the FPC to directly connect with the touch pad 230, the FPC is often provided integrally with the touch film, so it is not convenient for transportation and assembly if the FPC line is relatively long. By setting the adapter board, all the FPCs can be controlled at a certain length, fabricating the assembly of the display apparatus.

In an embodiment of the disclosure, the touch pad 230 is placed on the side where the FPCs are more concentrated, and only one FPC is connected with the FFC line through the adapter board, satisfying the connection requirement, and also minimizing the use of additional components and reducing the cost.

In some embodiments, the display apparatus further includes: a front housing, located at a ground-side of the display panel and configured to cover a plurality of flexible circuit boards at the ground-side of the display panel.

In the above specific embodiment, by arranging the first FPC connecting the plurality of driving lines with the touch pad and the second FPC connecting the plurality of sensing lines with the touch pad on one side of the touch film, the circuit boards such as the first FPC, second FPC and touch pad can be covered by the front housing of the display apparatus, which can reduce the bezel of the display apparatus and make it look more pleasing.

In some embodiments, the connections of the first FPC and the second FPC with the touch pad can be implemented in the following ways.

An implementation way is as follows.

The first FPC and the second FPC are connected with one side of the touch pad.

In some embodiments, as shown in FIG. 3, the first FPC connected with the driving lines TX and the second FPC connected with the sensing lines are connected with one side of the touch pad, for example, the side close to the touch film in FIG. 3.

Alternatively, another implementation way is as follows.

The first FPC and the second FPC are connected with at least two sides of the touch pad.

In some embodiments, the first FPC and the second FPC are connected with different sides of the touch pad.

Figure 6:
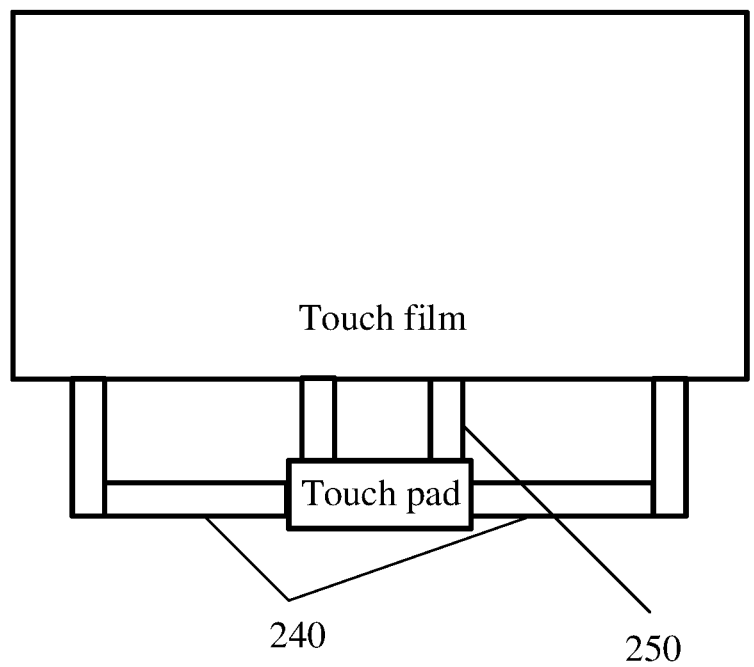
FIG. 6 is a schematic diagram of a touch control architecture according to some embodiments of the disclosure.

Specifically, as shown in FIG. 6, the first FPCs are connected with one side or at least two sides of the touch pad, and the second FPCs are connected with the other side of the touch pad.

In other embodiments, some of the first FPCs and the second FPCs may also be located on the same side of the touch pad, which is not limited in the disclosure.

In some embodiments, the number of first FPCs is at least two, and the at least two first FPCs are connected with opposite sides of the touch pad.

As shown in FIG. 6, the first FPCs are connected with the opposite sides of the touch pad along the extending direction of the driving lines in the touch film, that is, the opposite sides along the horizontal direction in FIG. 6.

Further, if both the first FPC and the second FPC are connected with one side of the touch pad, the length of the touch pad can be lengthened, so that the number of FPCs, especially the number of second FPCs, can be increased according to the touch precision requirement.

In the above specific embodiments, the number of connected FPCs can be increased by increasing the length and/or width of the touch pad, to thereby increase electrode lines and improve the touch precision.

In some embodiments, the number of the first FPCs and the second FPCs is determined according to the width of the frame BM area of the display panel.

In some embodiments, the number of second FPCs depends on the width of the frame BM area at the ground side of the display panel and the width of the frame BM area at the ground side of the display panel occupied by the driving lines.

Specifically, as shown in FIG. 4, since the driving lines are also drawn from the bottom to the first FPCs, a certain width of the BM area may be occupied. In order to reduce the portion of the BM area occupied by the sensing lines as much as possible, the number of second FPCs can be increased.

Four second FPCs are shown in FIG. 4. If only one second FPC is used, the width of the BM area will be increased under the condition that the spacing of electrode lines remains unchanged.

In the above specific embodiments, the number of FPCs connected with the touch pad can be flexibly adjusted according to the size of the BM area and the number of electrode lines.

In some embodiments, the plurality of driving lines are connected with the first FPC by bonding.

In some embodiments, the plurality of sensing lines are connected with the second FPC by bonding.

Here, the bonding is a process involving chip routing and chip coating, which can be used for the interconnection between electrode terminals and flexible circuit boards, the interconnection between flexible circuit boards and rigid circuit boards, and the interconnection between flexible circuit boards. For example, the conductive adhesive can be placed between the components that need to be connected, and then pressurized and heated to form the stable and reliable mechanical or electrical connection between the components. This process may also be referred to as thermocompression bonding or thermocompression.

In some embodiments, the first FPC may also be connected with the touch pad by bonding.

In some embodiments, the second FPC may also be connected with the touch pad by bonding.

In some embodiments of the disclosure, the plurality of driving lines are connected with the first flexible circuit board by bonding; and the plurality of sensing lines are connected with the second flexible circuit board by bonding.

The first flexible circuit board FPC is connected with the touch pad by bonding; and the second flexible circuit board FPC is connected with the touch pad by bonding, so as to achieve the tight connection between components and achieve the good electrical connection between components.

In some embodiments, in order to meet the user's high-precision touch requirement, the touch film can be divided into areas. The electrode lines can be added for the touch area with the high-precision touch requirement, the original number of electrode lines can be maintained or the number of electrode lines can be reduced for other areas of the touch film, so that the electrode lines occupy the BM area as little as possible, to avoid the too large width of the BM area.

In this implementation, the touch effect of some areas will be improved, but the basic touch function of other areas will not be affected.

At present, the trend of the display apparatus is that the BM area is as narrow as possible. But in order to meet the high-precision touch requirement, it is necessary to increase the number of touch channels, that is, increase the density of the driving lines TX and the sensing lines RX, while reducing the distance between adjacent driving lines TX and the distance between adjacent sensing lines RX, which may lead to an increase in the width of the BM. For example, increasing the number of electrode lines without changing the spacing of the electrode lines in the BM area will increase the width of the BM, or increasing the number of electrode lines while reducing the spacing of the electrode lines in the BM area has strict requirements for the manufacturing process and may not be realized. Therefore, in some embodiments of the disclosure, in order to meet both the appearance requirement and the high-precision touch requirement, the touch film can be divided into areas. For the areas with the high-precision touch requirement, the number of touch channels, namely electrode lines, can be increased; and for other areas, the less number of touch channels can be used to meet the basic touch function.

Figure 7A:
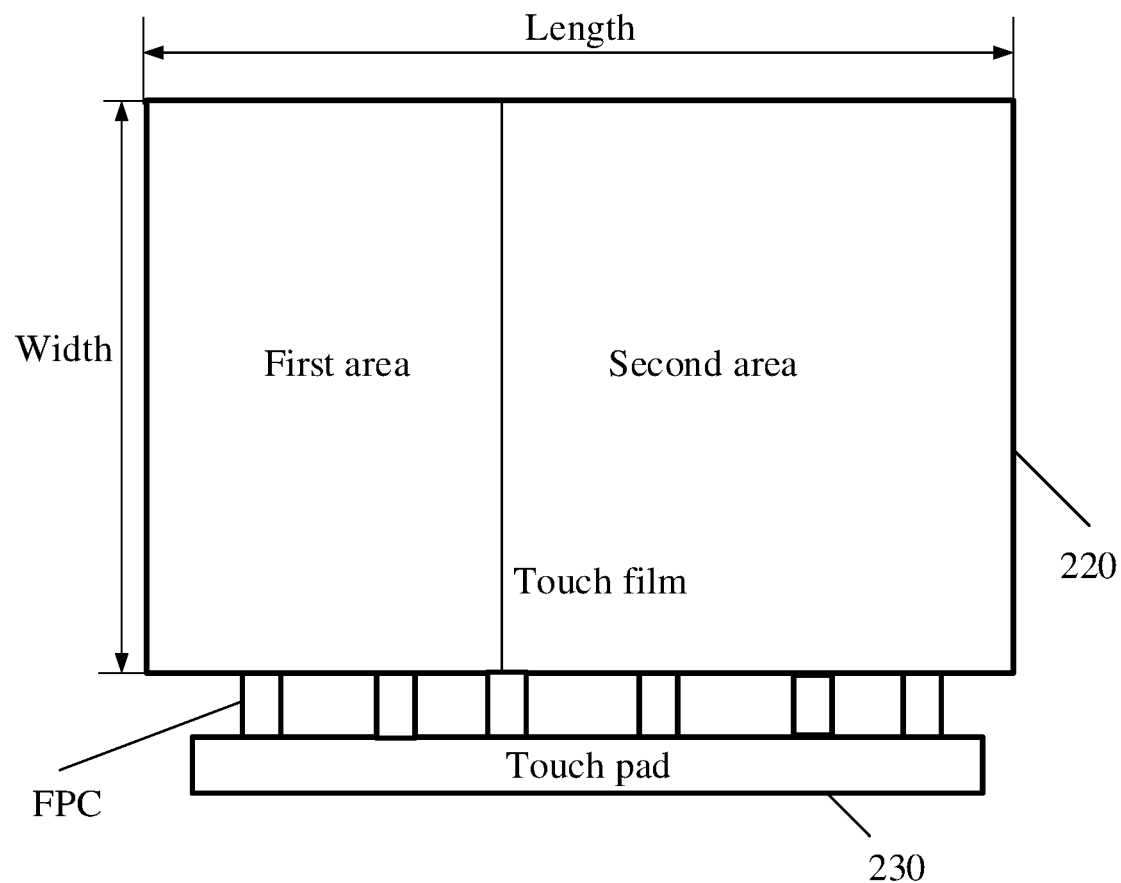
FIG. 7A is a schematic diagram of a touch control architecture according to some other embodiments of the disclosure.

FIG. 7A is a schematic diagram of a touch control architecture according to other embodiments of the disclosure. As shown in FIG. 2A, FIG. 2B and FIG. 7A, the display apparatus of this embodiment includes:
- a touch panel 200, configured to receive a touch operation and including a touch film 220 and a display panel 210;
- the touch film 220 includes a plurality of electrode lines, where the density of electrode lines located in a first area is greater than the density of electrode lines located in the second area;
- a touch pad 230, configured to drive and control the touch film 220;
- a plurality of flexible circuit boards (FPCs), through which the electrode lines of the touch film 220 are electrically connected with the touch pad 230.

In FIG. 7A, some areas (such as the first area) of the touch film can be provided with increased number of channels, that is, the density of the electrode lines distributed can be increased, according to the requirements, thereby improving the touch precision. Other areas, such as the second area, can be provided with fewer electrode lines to reduce the difficulty of the manufacturing process of the touch film, or reduce the BM width of the touch film, for example, the BM width on the right side of the touch film in FIG. 7A.

One first and one second area are taken as an example for illustration in FIG. 7, and the number of first areas and second areas is not limited in the embodiment of the disclosure.

Here, the areas of the first area and the second area are not limited, for example, the area of the first area is smaller than the area of the second area, or the area of the first area is greater than or equal to the area of the second area.

The display apparatus of this embodiment includes a touch film on one side of a display panel, where the touch film includes a plurality of electrode lines; the electrode lines of the touch film are connected with a touch pad through a plurality of flexible circuit boards. Since the density of electrode lines distributed in the first area is greater than the density of electrode lines distributed in the second area, the first area can meet the high-precision touch requirement, improving the touch effect of some areas.

In some embodiments, as shown in FIG. 7A, the width of the first area is equal to the width of the touch film.

In some embodiments, as shown in FIG. 7A, the width of the second area is equal to the width of the touch film.

The first area and the second area may be adjacently distributed on the left and right ends of the touch film.

Figure 7B:
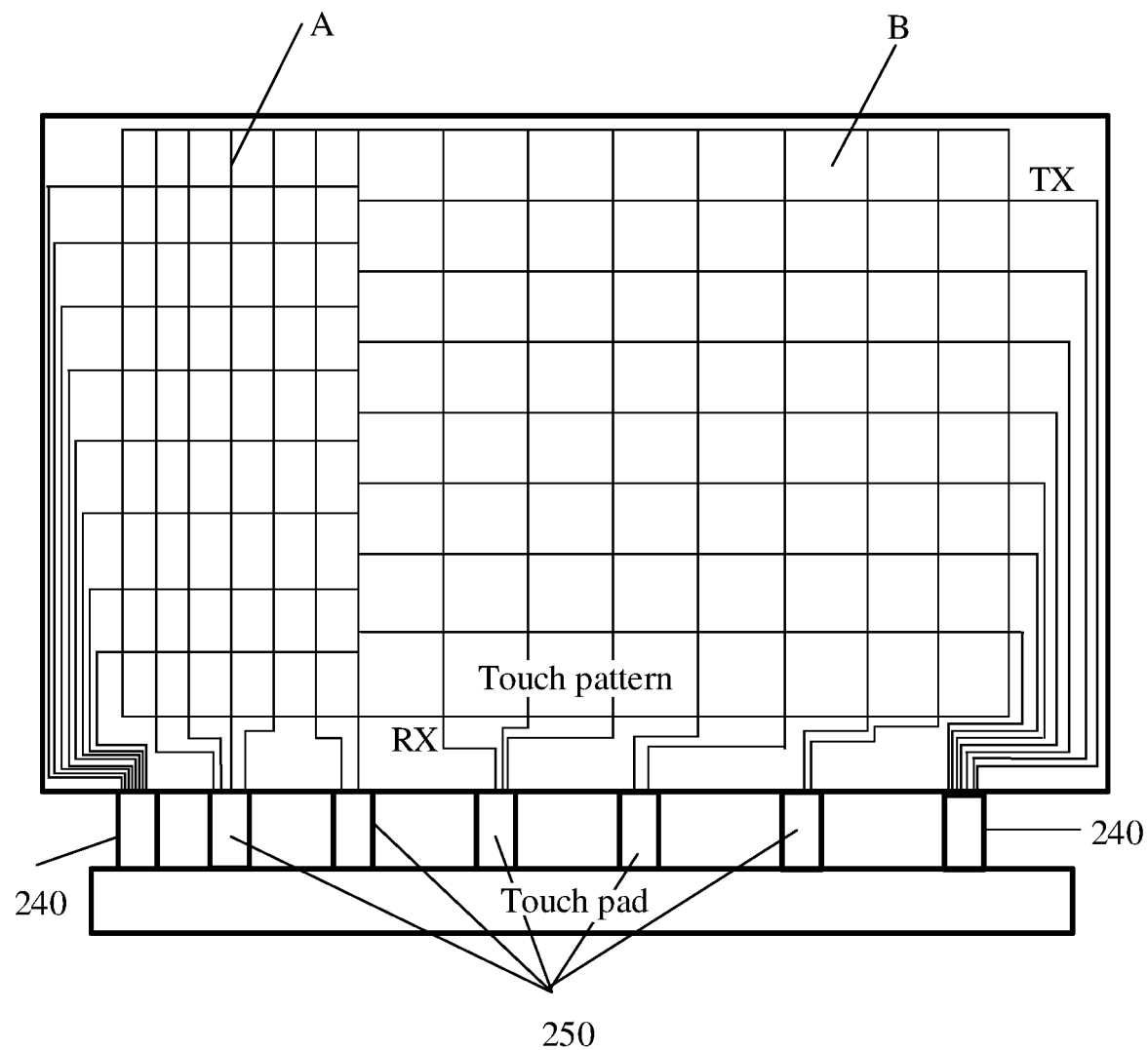
FIG. 7B is a schematic diagram of a touch line pattern according to some other embodiments of the disclosure.

In some embodiments, as shown in FIG. 7B, the FPCs include first FPCs 240 and second FPCs 250.

The driving lines TX are connected with the touch pad through the first FPCs 240.

The sensing lines RX are connected with the touch pad through the second FPCs 250.

As shown in FIG. 7B, the driving lines TX are connected with the touch pad through the first FPCs 240; the sensing lines RX are connected with the touch pad through the second FPCs 250, and the density of the driving lines TX and the sensing lines RX in the first area A is greater than the density of the driving lines TX and the sensing lines RX of the second area B.

As shown in FIG. 7B, the width of the first area is equal to the width of the touch film, and the width of the second area is equal to the width of the touch film, facilitating the wiring of electrode lines, especially the wiring of sensing lines. The sensing lines of the two areas can be routed from the same side of the touch film and connected with the touch pad through the flexible circuit boards, so as to avoid increasing the BM area on the other side of the touch film.

Figure 7C:
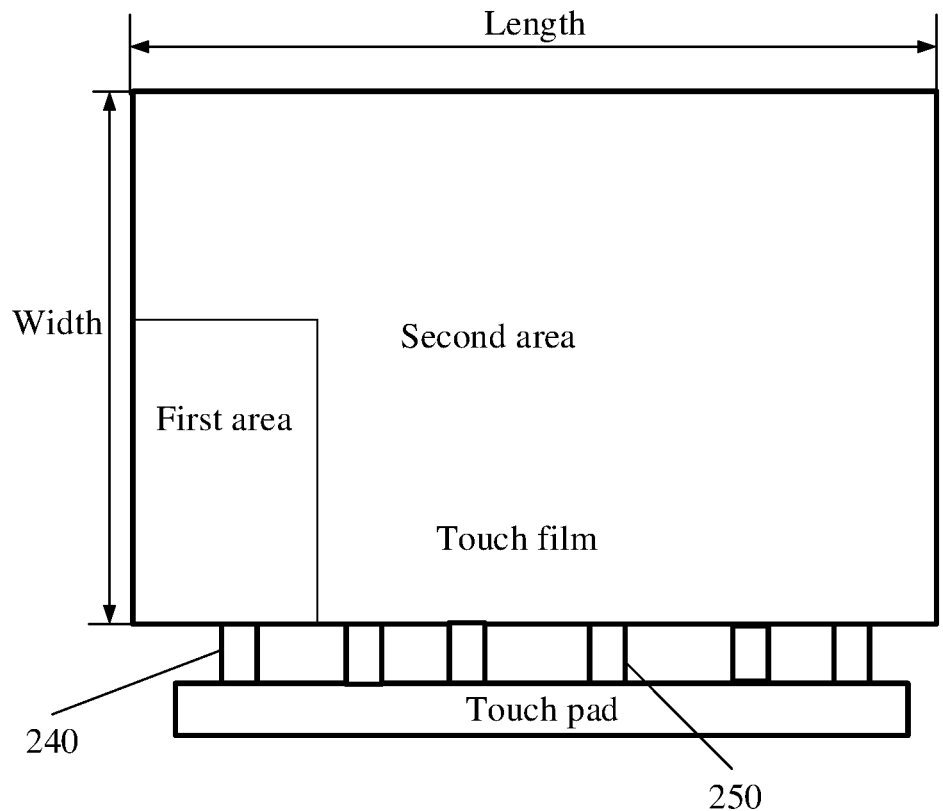
FIG. 7C is a schematic diagram of a touch control architecture according to some other embodiments of the disclosure.

In other embodiments, for example, as shown in FIG. 7C, the width of the first area is smaller than the width of the touch film, and the length of the first area is smaller than the length of the touch film. The remaining area is the second area.

For the structure of FIG. 7C, some sensing lines RX in the second area above the first area can be led out of the sky side of the touch film and connected with the touch pad from the back of the touch film, or a touch pad is added on the sky side of the touch film, which is not limited in the embodiment of the disclosure.

When the architecture as shown in FIG. 1 is used, it includes: a touch film (i.e., touch pattern), a flexible printed circuit (FPC) and a touch pad, where the touch film includes a plurality of driving lines TX and sensing lines RX, the touch film is connected with the touch pad through the FPC, and the touch pad is a driving circuit for controlling the touch film. There is a Black Matrix (BM) area between the Viewing Area (VA) and the Active Area (AA) of the touch film. One purpose of the black matrix area is to cover the existence of lines such as the sensing line RX and the driving line TX. If the touch precision is to be improved, the black matrix area will be increased. But in order to meet the appearance requirement, the black matrix area is usually reduced as much as possible, so the touch accuracy cannot be improved while meeting the appearance requirement.

Figure 8:
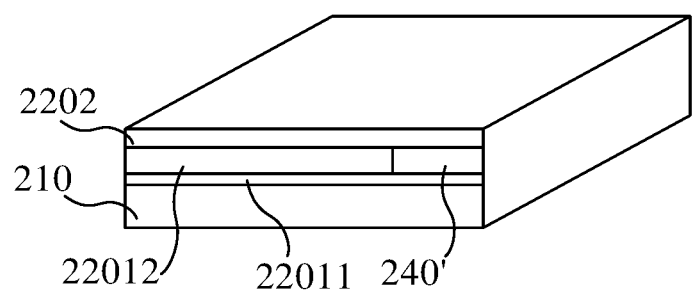
FIG. 8 is a cross-sectional view of a display apparatus according to some embodiments of the disclosure.

Referring to FIG. 2B and FIG. 8, the touch panel 200 is configured to receive a touch operation. The touch panel 200 includes a display panel 210 and a touch film 220, where the display panel 210 is configured to display an image, and the display panel 210 includes a display area and a circuit board on one side of the display area, through which the drive and display of the entire display panel is realized; the touch film 220 includes a touch sensor 2201 and a protective film 2202, where the touch sensor 2201 is located above the display panel 210, the protective film 2202 is attached onto the touch sensor 2201, and the protective film 2202 may be an anti-fingerprint film, an anti-blue light film, etc.

Referring to FIG. 2B and FIG. 8, the display apparatus further includes a touch pad 230 and a flexible circuit board 240', where the touch pad 230 is configured to drive and control the touch sensor 2201; and the flexible circuit board 240' electrically connects the touch sensor 2201 with the touch pad 230.

Referring to FIG. 2B, the display apparatus further includes a Chip On Flex (COF) and a source board 2101, where the chip on flex is respectively connected with the display panel 210 and the source board 2101, and the source board 2101 is configured to drive and control the display panel 210.

The disclosure is mainly directed to the display apparatus with the touch panel 200, and the structure, function, and implementation of the display apparatus will be firstly described in detail below.

Figure 11:
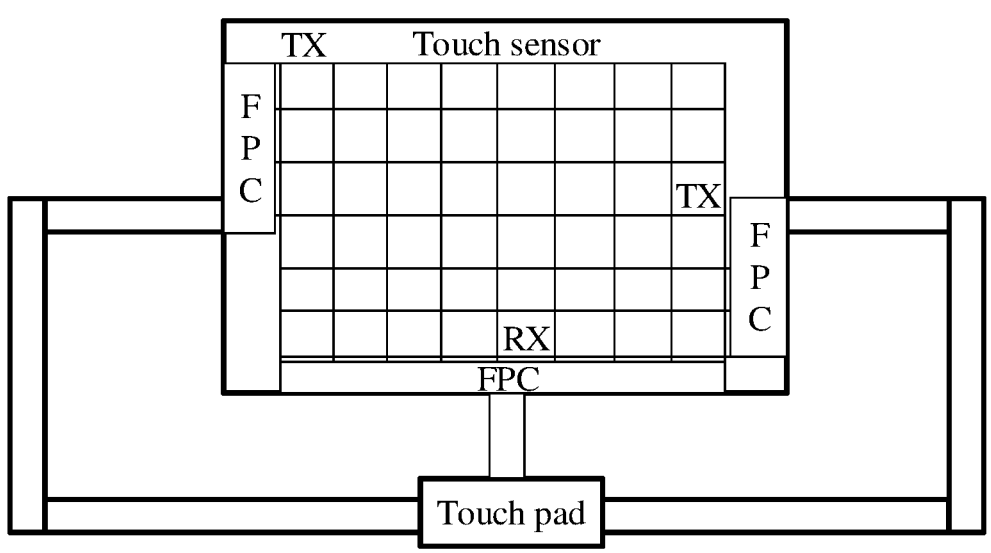
FIG. 11 is an architecture schematic diagram of a display apparatus according to some embodiments of the disclosure.

The touch panel 200 has a view area 201 and a black matrix area 202. The touch sensor 2201 includes a substrate 22011, which can be made of glass or PET (Polyethylene terephthalate) material. An electrode layer 22012 with electrode lines is wired on the substrate 22011, and the electrode layer 22012 is located in the viewing area 201 of the touch panel 200, and the electrode lines of the electrode layer 22012 pass through the black matrix area 202 and are electrically connected with the touch pad 230. At present, the trend of the display apparatus is that the black matrix area 202 is as narrow as possible. But in order to meet the high-precision touch requirement, it is necessary to increase the number of touch channels, that is, increase the density of the driving lines TX and the sensing lines RX, while reducing the distance between adjacent driving lines TX and the distance between adjacent sensing lines RX, which may lead to an increase in the width of the black matrix area 202. For example, increasing the number of electrode lines on the basis of not changing the spacing of the electrode lines in the black matrix area 202 will increase the width of the black matrix area 202, or increasing the number of electrode lines while reducing the spacing of the electrode lines in the black matrix area 202 has the higher requirement for the manufacturing process and may not be realized. Therefore, in order to be compatible with the appearance requirement and high-precision touch requirement, in some embodiments of the disclosure, the flexible circuit board 240' is directly disposed on the black matrix area 202 of the touch panel 200, and the electrode lines coming out from the viewing area 201 can be directly connected with the flexible circuit board 240', as shown in FIG. 11.

The related art is subject to the required materials and the process technology for directly fabricating electrode lines on the substrate 22011, so that the electrode lines fabricated on the substrate 22011 of the touch sensor 2201 located in the black matrix area 202 of the display apparatus have the larger line width and line spacing (for example, the line width and line spacing of the electrode lines are both more than 60 μm). However, the flexible circuit board 240' in the display apparatus of the embodiment of the disclosure is arranged in the black matrix area 202 of the touch panel 200, and the electrode lines in the original black matrix area 202 are directly arranged in the flexible circuit board 204'. The process technology of the flexible circuit board 204' can make the line width and line spacing of the internal electrode lines smaller (for example, reduced by 30 μm compared with the line width and line spacing of the electrode lines directly on the original substrate 22011), so that more electrode lines can be arranged without increasing the area of the black matrix area 202 of the touch panel 200, thereby improving the touch precision of the display apparatus. The display apparatus of the embodiments of the disclosure can be applied to a television, a computer display, etc.

The embodiments of the disclosure will be described in detail below with specific embodiments. Several specific embodiments below may be combined with each other, and the same or similar elements or processes may be omitted in some embodiments.

FIGS. 2A-2B and FIGS. 8-11 show specific embodiments of the display apparatus of the disclosure. The touch panel 200 of the display apparatus includes a display panel 210, a touch film 220 and a touch pad 230, where the touch film 220 includes a touch sensor 2201 and a protective film 2202, and the display panel 210 is located under the touch sensor 2201; the touch pad 230 is configured to drive and control the touch sensor 2201; the touch panel 200 is provided with a viewing area 201 and a black matrix area 202, the touch sensor 2201 includes a substrate 22011 on which an electrode layer 22012 with electrode lines is wired, the electrode layer 22012 is located in the viewing area 201 of the touch panel 200, the black matrix area 202 of the touch panel 200 is provided with a flexible circuit board 240' connected with the electrode lines in the electrode layer 22012, and the flexible circuit board 240' extends outside the black matrix area 202 and is electrically connected with the touch pad 230. In the above implementation, there is no need to specially arrange an external flexible circuit board to connect the flexible circuit board 240' of the black matrix area 202 with the touch pad 230, but instead, the flexible circuit board 240' in the black matrix area 202 is extended outside the black matrix area 202 and directly connected with the touch pad 230. The process thereof is more convenient.

Figure 9:
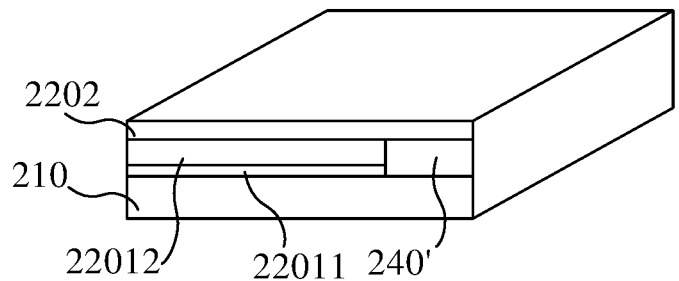
FIG. 9 is a cross-sectional view of another display apparatus according to some embodiments of the disclosure.
Figure 10:
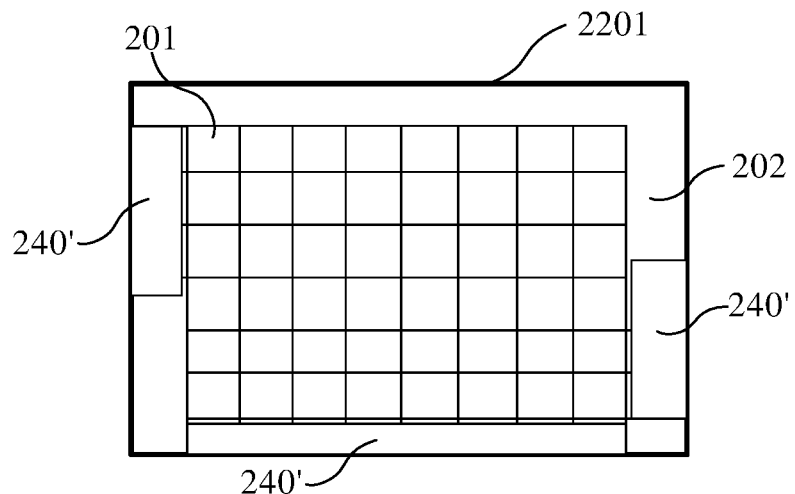
FIG. 10 is an architecture schematic diagram of a touch sensor in a display apparatus according to some embodiments of the disclosure.

It should be noted that the above-mentioned substrate 22011 may only be disposed in the viewing area 201, and the lower surface of the flexible circuit board 240' is flush with the lower surface of the substrate 22011, as shown in FIG. 8. Alternatively, the above-mentioned substrate 22011 extends from the viewing area 201 into the black matrix area 202, and the flexible circuit board 240' is located above the substrate 22011, as shown in FIG. 9. For example, the lower surface of the flexible circuit board 240' is connected (e.g., connected by adhesive) to the upper surface of the substrate 22011.

The electrode lines in the touch sensor 2201 include a plurality of driving lines TX and a plurality of sensing lines RX, where the plurality of driving lines TX and the plurality of sensing lines RX are both connected with the flexible circuit board 240' by bonding, to achieve the tight connection and fine electrical connection between the electrode lines and the flexible circuit board 240'.

FIG. 11 shows a schematic diagram of a touch line pattern. In FIG. 11, the lines in the horizontal electrode lines are driving lines TX, and the lines in the vertical electrode lines are sensing lines RX.

The number of sensing lines RX can be set to be greater than the number of driving lines TX to ensure the touch precision. For example, the number of sensing lines RX is twice the number of driving lines TX.

It should be noted that the bonding is a process of chip routing and chip coating, and the bonding can be used for the interconnection between electrode terminals and flexible circuit boards, the interconnection between flexible circuit boards and rigid circuit boards, and the interconnection between flexible circuit boards. For example, the conductive adhesive can be placed between the components that need to be connected, and then pressurized and heated to form the stable and reliable mechanical or electrical connection between the components. This process may also be referred to as thermocompression bonding or thermocompression.

The flexible circuit board 240' in the embodiment of the disclosure may also be connected with the touch pad 230 by bonding.

There may be one or more flexible circuit boards 240' arranged in the black matrix area 202 of the touch panel 200 of the display apparatus in the embodiments of the disclosure. For example, the flexible circuit board 240' is arranged on any of the ground side 104, the left side 102, the right side 103 and the sky side 101 of the substrate 22011. In another example, the flexible circuit boards 240' are arranged in the black matrix area 202 on any two, three or four of the ground side 104, the left side 102, the right side 103 and the sky side 101 of the substrate 22011, and a plurality of driving lines and a plurality of sensing lines are electrically connected with the flexible circuit boards 240' on the corresponding side respectively. In the display apparatus shown in FIG. 11, the flexible circuit boards 240' are arranged in the black matrix area 202 on the ground side 104, the left side 102 and the right side 103.

Figure 12:
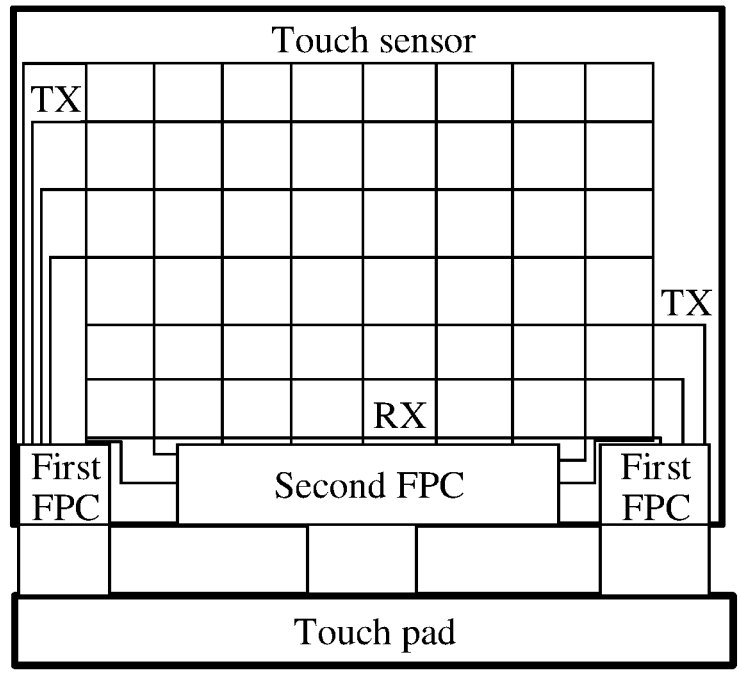
FIG. 12 is another architecture schematic diagram of a display apparatus according to some embodiments of the disclosure.

Referring to FIG. 12, the plurality of flexible circuit boards 240' include a first flexible circuit board (hereinafter referred to as first FPC) and a second flexible circuit board (hereinafter referred to as second FPC), where the first FPC electrically connects the plurality of driving lines TX to the touch pad 230; and the second FPC electrically connects the plurality of sensing lines RX to the touch pad 230. The plurality of flexible circuit boards 240' are located on the same side of the substrate 22011 (such as the ground side 104 of the black matrix area 202), that is, the first FPC and the second FPC are located on the same side of the substrate 22011, which can reduce the frame size of the display apparatus.

The number of first FPCs and the number of second FPCs can be allocated according to needs, for example, according to the width of the black matrix area 202 or the aspect ratio of the viewing area 201 of the substrate 22011.

In the embodiments shown in FIG. 2B, the display apparatus further includes a Chip On Flex (COF) and a source board 2101, where the chip on flex is respectively connected with the display panel 210 and the source board 2101, and the Chip On Flex (COF) can be regarded as a third flexible circuit board that extends beyond the source board 2101.

The third flexible circuit board and the first FPC and the second FPC in the touch sensor 2201 are all located on the same side of the display panel 210. In this way, the same component can be used to achieve full shielding and can be used on only one side, facilitating the frameless design of the other three sides without significantly changing the original home TV set.

Figure 13:
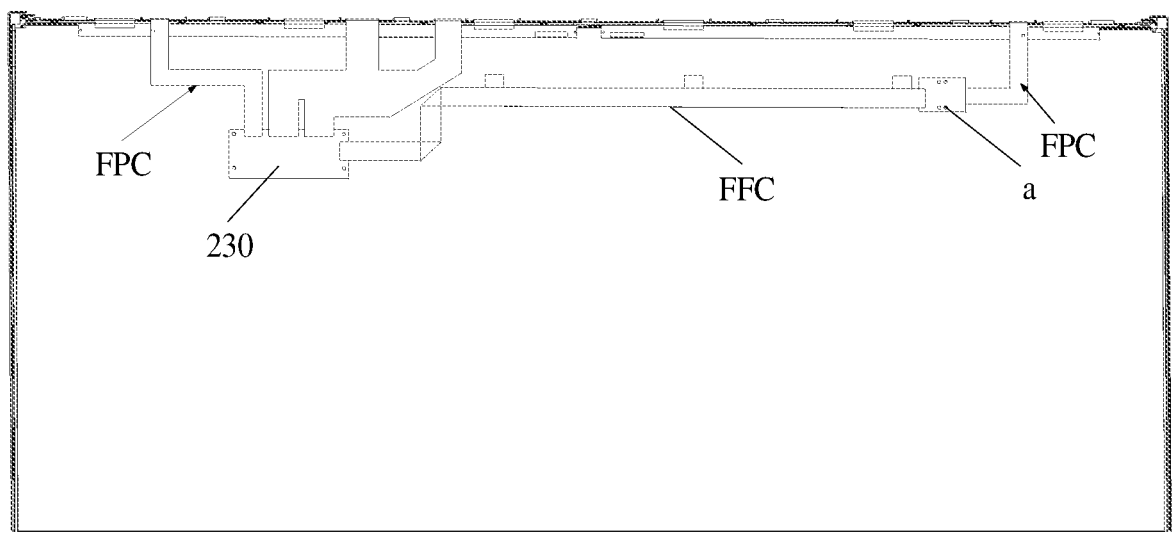
FIG. 13 is a structural schematic diagram of a display apparatus according to some embodiments of the disclosure.

Further referring to FIG. 13, in the display apparatus of this embodiment, the third flexible circuit board, the first FPC and the second FPC are arranged alternatively to avoid friction between the upper and lower layers.

Both the first FPC and the second FPC are bent from the ground side 104 to the back of the display apparatus, reducing the width of the outer frame on the ground side 104 of the display apparatus and facilitating the installation, fixation and reception of the touch pad 230.

The display apparatus of embodiments of the disclosure further includes a front housing. Since the third flexible circuit board, the first FPC and the second FPC in the touch sensor 2201 are all located on the same side of the display panel, all the flexible circuit boards (including the first FPC, the second FPC and the third flexible circuit board) can be covered by only installing the front housing on this side, reducing the frame size of the display apparatus.

In some embodiments of the disclosure, the display apparatus further includes an adapter board a, through which one or more of the plurality of flexible circuit boards 240' installed in the touch sensor 2201 is/are electrically connected with the touch pad 230, so as to adapt to the placement position of the touch pad 230 and also facilitate the assembly of the display apparatus.

It should be noted that, in an embodiment of the disclosure, the display apparatus further includes a Flexible Flat Cable (FFC), through which the connection between the touch pad 230 and the adapter board a is realized.

The first FPC and the second FPC are connected with the touch pad 230. If the touch pad 230 is not large enough, or in order to avoid the placement positions of other circuit boards in the home TV, the touch pad 230 is often not placed in the middle position. When the touch pad 230 is placed in a non-middle part, that is, close to an end of the display apparatus, a flexible circuit board 240' (the first FPC or the second FPC) located at the edge in FIG. 13 relative to the touch pad 230 is connected with the touch pad 230 through the adapter board a.

If the first FPC (or the second FPC) is made with a length to directly connect to the touch pad 230, the first FPC (or the second FPC) is often provided integrally with the touch sensor 2201, so it is not convenient for transportation and assembly if the line of the first FPC (or the second FPC) is relatively long. By setting the adapter board a, all the FPCs can be controlled at a certain length, fabricating the assembly of the display apparatus.

It should be noted that the touch pad 230 is placed on the side where the FPCs are more concentrated, and only one FPC is connected with the FFC line through the adapter board a, satisfying the connection requirement, and also minimizing the use of additional components and reducing the cost.

In an embodiment of the disclosure, the number of connectable first FPCs and the number of connectable second FPCs can also be increased by increasing the length of the touch pad 230 or the width of the touch pad 230 or increasing the length and width of the touch pad 230 simultaneously, to thereby increase electrode lines and improve the touch precision.

In some other embodiments of the disclosure, the electrode layer of the touch sensor 2201 in the display apparatus is designed by dividing areas. The electrode lines can be increased in the touch area with the high-precision touch requirement, and the original number of electrode lines can be maintained or the number of electrode lines can be reduced in other areas of the touch sensor 2201, so that the electrode lines occupy the black matrix area 202 as little as possible, to avoid the too large width of the black matrix area 202 and also improve the touch effect in some areas without affecting the basic touch function of other areas.

Figure 14:
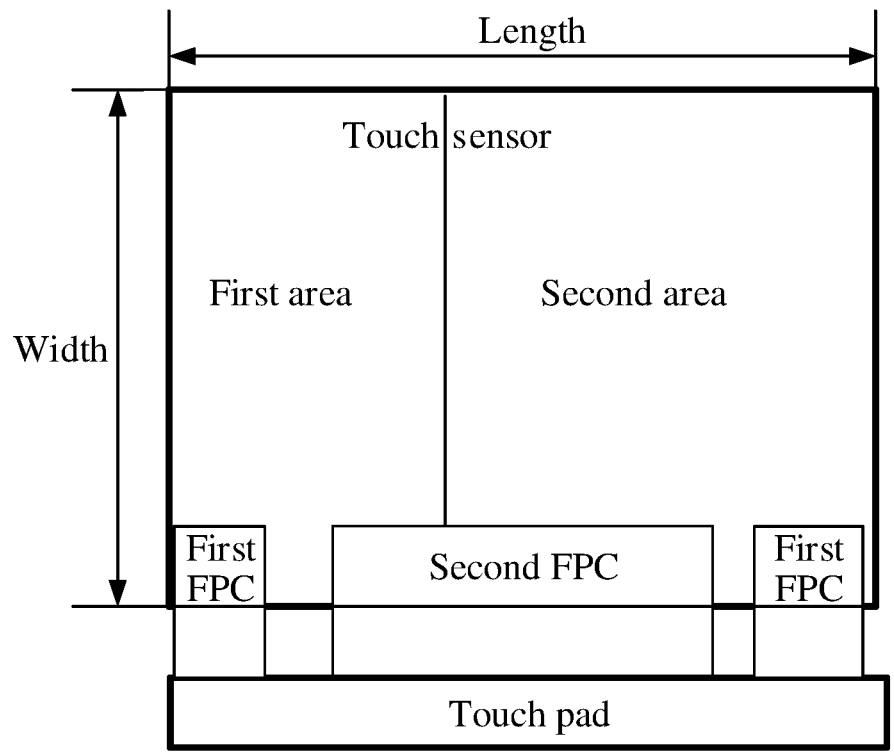
FIG. 14 is one of schematic diagrams of a first partition architecture of electrode lines in a display apparatus according to some embodiments of the disclosure.

Referring to FIG. 14, the electrode layer in the touch sensor 2201 of the embodiment of the disclosure includes a first area and a second area, where a plurality of electrode lines of the electrode layer 22012 are wired in the first area and the second area, and the density of electrode lines located in the first area is greater than the density of electrode lines located in the second area, improving the touch precision of the first area; and the second area can use fewer electrode lines, which allows for reducing difficulty of the manufacturing process of the touch sensor 2201.

Figure 15:
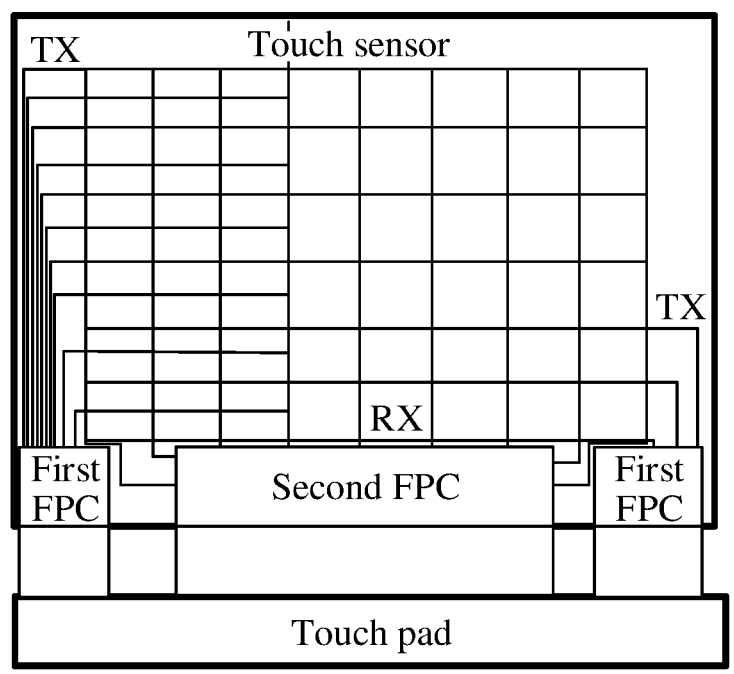
FIG. 15 is the second one of schematic diagrams of a first partition architecture of electrode lines in a display apparatus according to some embodiments of the disclosure.

One first area and one second area are taken as an example for illustration in FIG. 15, and the number of first areas and second areas is not limited in the embodiments of the disclosure.

Here, the areas of the first area and the second area are not limited, for example, the area of the first area is smaller than the area of the second area, or the area of the first area is greater than the area of the second area, or the area of the first area is equal to the area of the second area.

The width of the first area and the width of the second area shown in FIG. 14 and FIG. 15 are both equal to the width of the substrate 22011 in the touch sensor 2201, and the first area and the second area are adjacently distributed on the left and right ends of the substrate 22011 in the touch sensor 2201, facilitating the wiring of the electrode lines, especially the wiring of the sensing lines RX.

Figure 16:
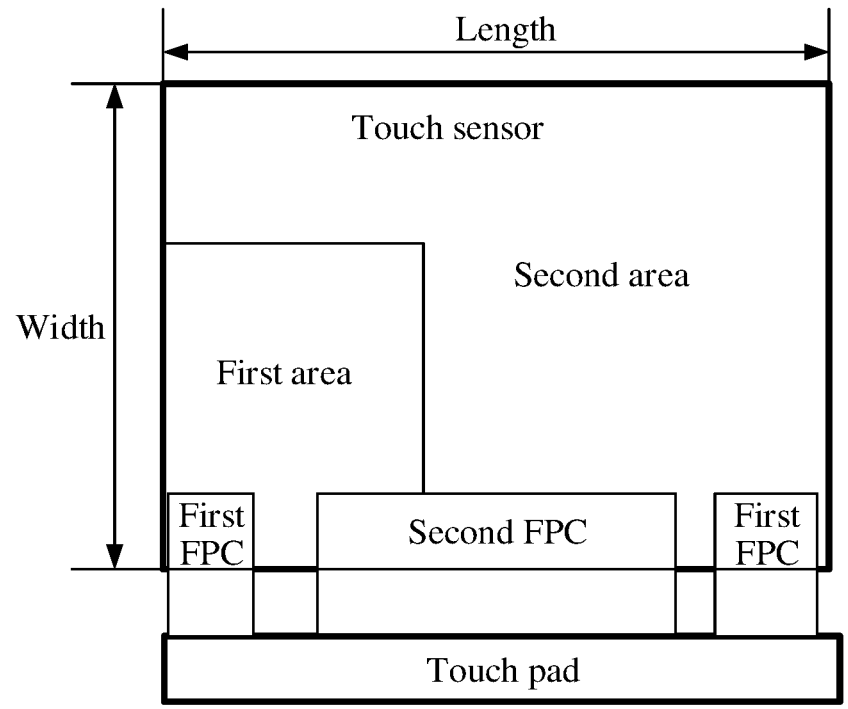
FIG. 16 is a schematic diagram of a second partition architecture of electrode lines in a display apparatus according to some embodiments of the disclosure.

The width of the first area of the viewing area of the electrode layer 22012 shown in FIG. 16 is smaller than the width of the touch sensor 2201, the length of the first area is smaller than the length of the touch sensor 2201, and the remaining area of the viewing area of the electrode layer 22012 is the second area, where some sensing lines RX in the second area above the first area can be led out of the sky side of the touch sensor 2201 and connected with the touch pad 230 from the back of the touch sensor 2201, or a touch pad 230 is added on the sky side of the touch sensor 2201, which is not limited in the embodiments of the disclosure.

When the TV enters the writing mode, the user can write on the TV screen through the touch function, where the response time of the writing function will affect the fluency of the user's feeling. When the user writes on the screen, if the content written by the user can be displayed on the screen within a short period of time, the writing fluency is better, and the user experience can also be improved. A current scheme is: after receiving the user's touch position information, the touch chip sends the coordinate information of the touch position to the main controller, and then the coordinate information is processed by the main controller and then sent to the timing controller to generate the display data.

Since the main controller needs to process various data (including, for example, audio data, playing display data, etc.) in the TV, the response time is long if the main controller processes the coordinate information and then sends it to the timing controller to generate and present the display data on the display, which cannot meet the requirement.

Firstly, the terms involved in the disclosure will be explained.

TCON: Time Controller.

SOC: System-on-a-Chip, also known as SOC chip. In the embodiments of the disclosure, the SOC represents a main controller or a main controller chip.

FPGA: Field Programmable Gate Array.

Figure 17:
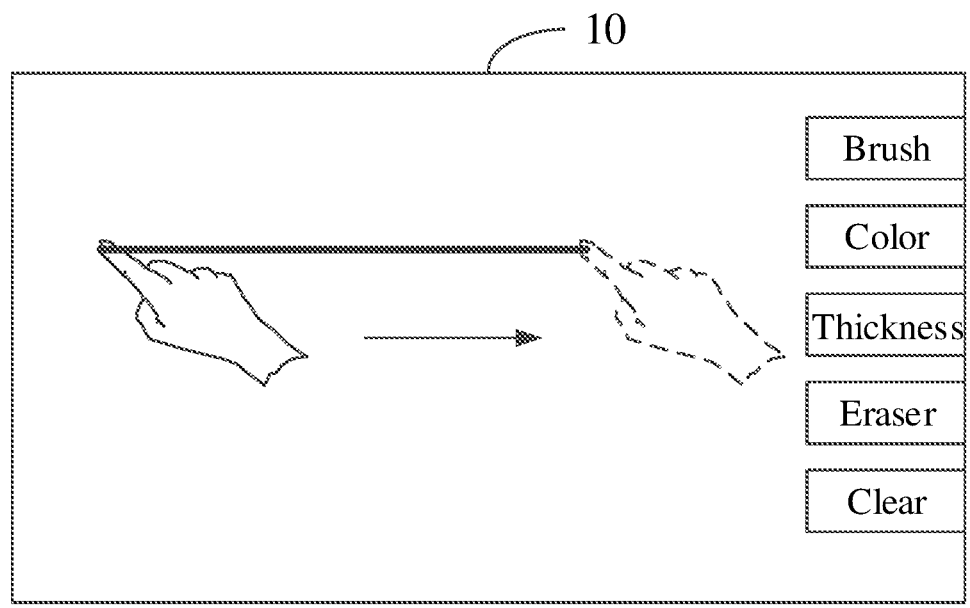
FIG. 17 illustrates an application scenario according to some embodiments of the disclosure.

FIG. 17 is a schematic diagram of an application scenario according to some embodiments of the disclosure. As shown in FIG. 17, it is a display screen 10 of a TV set, and the display screen 10 is a touch display screen on which a user can perform the touch operation. When the TV set enters the writing state, the user can write on the display screen 10 by touching. On the right side of the display screen 10, the brush can be clicked to write, the color of the brush can be adjusted through the "Color" control, and the thickness of the picture can be adjusted through "Thickness" control. The written trajectory can be erased through "Eraser" control, all written trajectories on the display screen 10 can be removed through "Clear" control, and so on.

For example, in FIG. 17, the user draws a straight line from left to right, and the straight line will be present on the display screen 10. It takes a certain amount of time from when the user starts to touch a certain position of the display screen 10 to when the trajectory of the brush is presented at the touched position, and this time period is the delay of touch writing.

The current scheme of the touch display on the TV is: after the user touches the display screen 10, the touch chip sends the coordinate information of the touch position to the main controller, and the coordinate information is processed by the main controller and then sent to the timing controller for processing, and presented on the display. Since the main controller needs to process a variety of data (such as the playing data of TV program, the audio data, etc.) including the coordinate information of the touch position, the main controller cannot process the coordinate information of the touch position timely while processing other data. Therefore, the delay of touch writing in the current scheme is relatively large. Usually, the touch writing delay on a PC is about 90 ms, and the touch writing delay under the Android system is about 60 ms, etc.

When the touch writing delay is relatively large, it takes a long time to display on the screen after the user writes on the display screen 10, and the display fluency of the TV set is poor. In view of the above issue, the embodiments of the disclosure provide a display apparatus and a touch display method, so as to reduce the touch writing delay and improve the fluency of the display apparatus. The embodiments of the disclosure will be described below with reference to the accompanying drawings.

Figure 18:
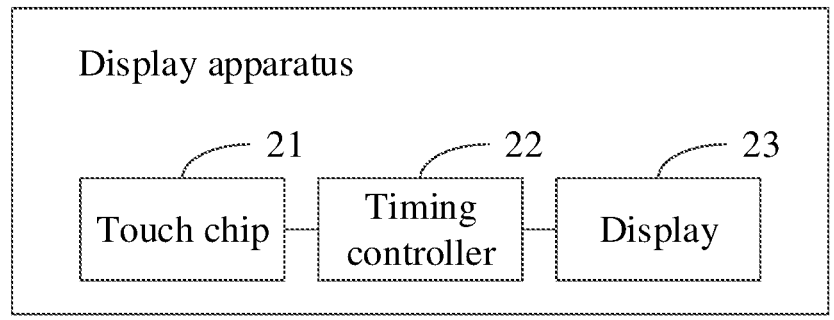
FIG. 18 is a structural schematic diagram of a display apparatus according to some embodiments of the disclosure.

FIG. 18 is a structural schematic diagram of a display apparatus according to some embodiments of the application. As shown in FIG. 18, the display apparatus includes a touch chip 21, a timing controller 22 and a display 23, where: the touch chip 21 is configured to obtain touch coordinates of a user on the display, and send the touch coordinates to the timing controller 22; the timing controller 22 is configured to receive the touch coordinates, generate display data according to the touch coordinates, and send the display data to the display 23; the display 23 is configured to display based on the display data.

When the user performs a touch writing operation on the display, the touch chip 21 can obtain the coordinates of the user's touch position on the display, that is, the touch coordinates, and then the touch chip 21 sends the touch coordinates to the timing controller 22.

The timing controller 22 can be implemented by an FPGA or an ARM chip. After receiving the touch coordinates sent from the touch chip 21, the timing controller 22 stores the touch coordinates and the corresponding information such as thickness and color of a brush, and then provides a touch layer by paint canvas. When the user performs the touch writing operation, the timing controller 22 may obtain touch coordinates at a certain time interval, generate the display data according to the touch coordinates, and then send the display data to the display 23. After receiving the display data, the display 23 displays the corresponding picture content according to the display data, where the picture content displayed on the display 23 corresponds to the content written by the user and is formed by continuously obtaining touch coordinates.

The display apparatus according to embodiments of the disclosure includes a touch chip, a timing controller and a display, where the touch chip is configured to obtain touch coordinates of a user on the display and send the touch coordinates to the timing controller; the timing controller is configured to receive the touch coordinates, generate display data according to the touch coordinates, and send the display data to the display; and the display is configured to display based on the display data. In the embodiment of the disclosure, the touch chip sends the touch coordinates directly to the timing controller after obtaining the touch coordinates, the timing controller processes the touch coordinates, and the display displays the corresponding picture content according to the display data after the display data is generated, without processing the touch coordinates by the main controller and then sending the touch coordinates to the timing controller for display on the display. The timing controller only needs to process the touch coordinates sent from the touch chip, and the main controller needs to process other types of data except the touch coordinates, so the timing controller directly processes the touch coordinates in the embodiments of the disclosure, which can realize real-time processing and save the step of sending the touch coordinates from the main controller to the timing controller after processing, thus reducing the touch delay, improving the fluency of the display apparatus, and further improving the user experience.

The embodiments of the disclosure will be described in detail below with reference to the accompanying drawings.

Figure 19:
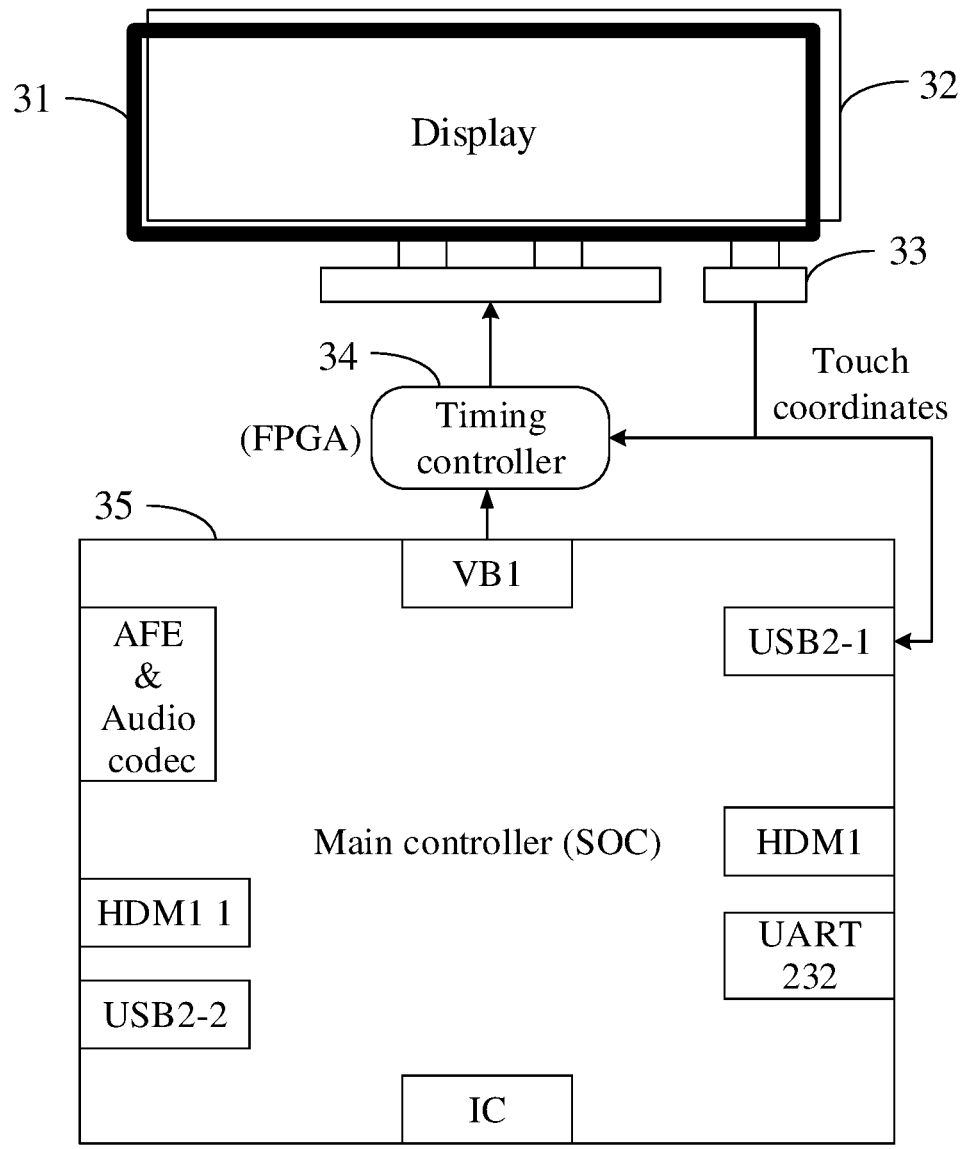
FIG. 19 is a schematic diagram of the structure of a circuit according to some embodiments of the disclosure.

FIG. 19 is a schematic diagram of a circuit structure according to an embodiment of the disclosure, as shown in FIG. 19, including a display 31, a touch film 32, a touch chip 33, a timing controller 34 and a main controller 35, where the touch film 32 is arranged on the surface of the display 31, and the display 31 can sense the user's touch through the touch film 32.

For the timing controller 34, since the general timing controller chip (TCON IC) has a limited data processing capability, the embodiment of the disclosure may use an FPGA to implement the function of the timing controller 34, or other chip with better data processing capability (such as ARM chip, etc.) may be used.

Further, a transmission interface is arranged on the timing controller, and the touch chip 33 is configured to obtain the touch coordinates of a user on the display 31 of the display apparatus according to a preset time interval, and send the touch coordinates to the timing controller 34 through the transmission interface. For example, the transmission interface may be an I2C interface, which is configured to receive the touch coordinates sent from the touch chip 33 and transmit them to the timing controller 34.

In FIG. 19, the touch chip 33 not only sends the touch coordinates to the timing controller 34, but also sends the touch coordinates to the main controller 35, and the main controller 35 forms a canvas upon receiving and storing the touch coordinates. In FIG. 19, the touch chip 33 sends the touch coordinates to the main controller 35, and the main controller 35 receives the touch coordinates through USB2-1. Also, the data transmission between the main controller 35 and the touch chip 33 is performed based on USB protocol. Optionally, the data transmission between the main controller 35 and the touch chip 33 may also be performed based on other type of protocol. In this case, the interface on the main controller 35 may be other type of interface.

The main controller 35 is configured to uniformly process and control all kinds of data in the display apparatus, and further configured to send the playing data to the timing controller 34, where the playing data is the data that needs to be played on the display apparatus. For example, when the display apparatus is a TV set, the playing data is the TV program played on the TV set.

When the display of the display apparatus needs to present the playing data, the user's touch writing on the display will eventually be displayed together with the playing data. Specifically, the timing controller receives the touch coordinates sent from the touch chip and the playing data sent from the main controller, then generates the display data according to the touch coordinates and the playing data, and sends the display data to the display, so that the display presents the corresponding picture content according to the display data after receiving the display data.

Since the playing data and the touch coordinates are not generated together, the timing controller needs to superimpose the touch coordinates and the playing data according to the mapping relationship between the touch coordinates and the pixels of the playing data to generate the display data and then send the display data to the display, when the playing data and the touch coordinates need to be shown together.

The process will be described below with reference to the accompanying drawings.

Figure 20:
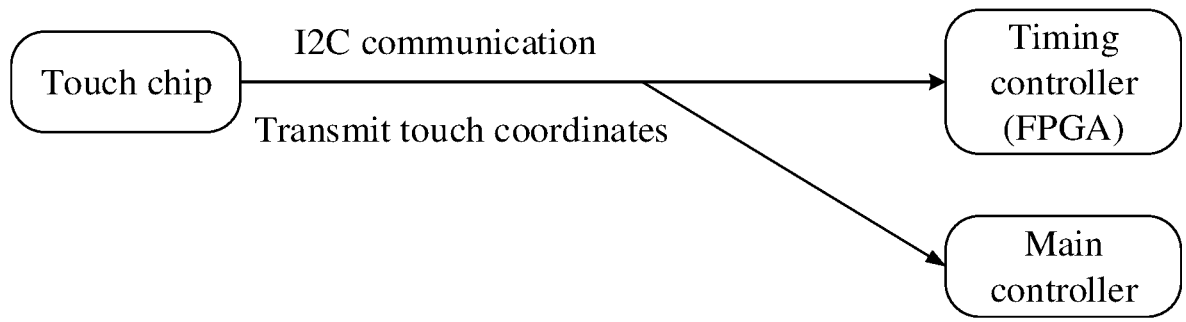
FIG. 20 is a schematic diagram of a transmission path of touch coordinates according to some embodiments of the disclosure.

FIG. 20 is a schematic diagram of a transmission path of touch coordinates according to some embodiments of the disclosure. As shown in FIG. 20, the touch chip communicates with the timing controller through an I2C interface, and the touch chip sends the touch coordinates to the timing controller through the I2C chip. The timing controller can be an FPGA. The touch coordinates are also sent to the main controller (SOC) through the touch chip.

When the user performs a touch operation on the display screen, the touch chip obtains the touch coordinates of the user on the display of the display apparatus according to the preset time interval, and sends the touch coordinates to the timing controller through the transmission interface. This process will be described below with reference to FIG. 21.

Figure 21:
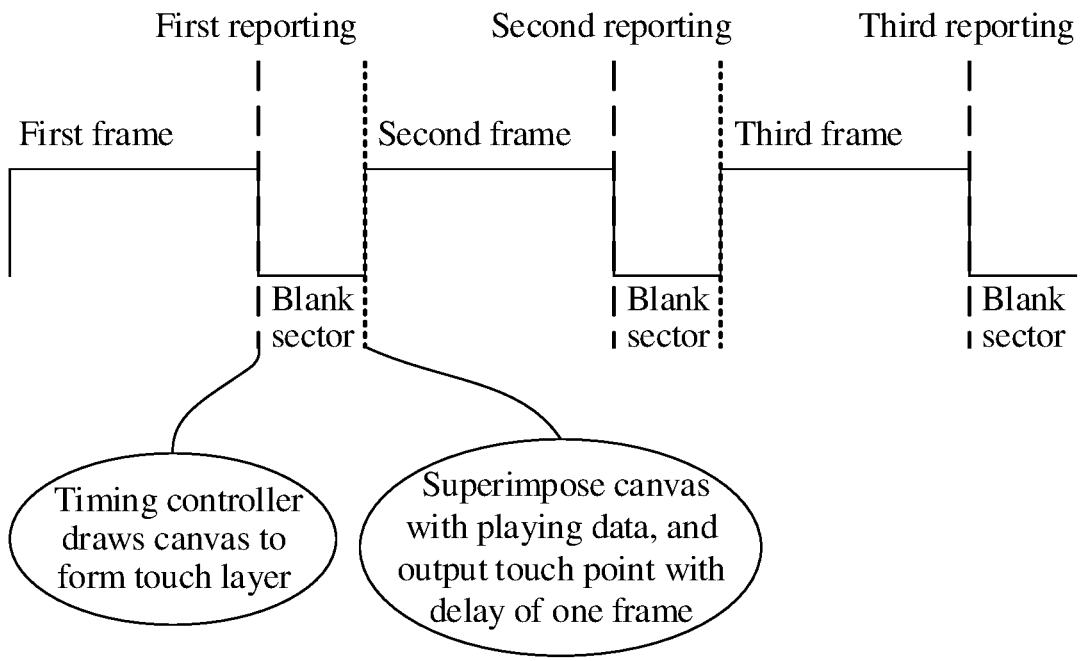
FIG. 21 is a schematic diagram of a touch timing sequence according to some embodiments of the disclosure.

FIG. 21 is a schematic diagram of a touch timing sequence according to some embodiments of the disclosure. As shown in FIG. 21, the touch IC has a reporting rate of 60 Hz. After receiving the touch coordinates, the TCON stores the data (touch coordinates and color information) and provides a touch layer by paint canvas.

In embodiments of the disclosure, the reporting rate refers to the number of reporting times per second for the touch IC, and the reporting rate of 60 Hz means that the touch IC performs reporting 60 times per second. Corresponding to each reporting, the timing controller will perform the process of drawing canvas once.

Taking the user writing Chinese character "—" on the display as an example, when the user performs touch writing on the display, it is a continuous process. For example, the user writes "—" with one continuous stroke, which may take 0.5 s or 1 s. In this process, the touch IC obtains the touch coordinates of the user on the display according to a preset time interval, which depends on the reporting rate of the touch IC.

Specifically, the touch chip obtains the touch coordinates of the user on the display of the display apparatus according to the preset time interval, and sends the touch coordinates to the timing controller through the transmission interface. The timing controller receives the touch coordinates sent from the touch chip and the playing data sent from the main controller, and then generates the current display data according to the touch coordinates, the playing data and a previous frame of display data, and sends the current display data to the display.

For example, when the touch IC runs at the reporting rate of 60 Hz, it means that the touch IC will perform reporting 60 times within 1 s, and the user's touch coordinates will be obtained once for each reporting. The preset time interval $\Delta t$ at this time is:

$$\Delta t = 1s/60 \ Hz = 0.016s = 16 \ ms.$$

That is, the touch IC performs reporting every about 16 ms. In each reporting, a frame of data is obtained, a touch coordinate is obtained, and the process of drawing canvas is performed once. In the example of FIG. 21, the reporting process is performed in the previous period of each frame, and the process of drawing canvas is performed in the blank sector of the latter period.

Assuming that the touch coordinates obtained during the first reporting indicate point A, the written point A will be displayed in the canvas drawing, and the touch coordinates (point A) will be stored. The stored data includes the coordinates of point A and the information such as color and thickness of the brush. The touch coordinates obtained during the second reporting indicate point B. Then, when the canvas is drawn for the second time, the written point B will be displayed, and the point A during the first point reporting will be displayed, that is, the touch coordinate points obtained during multiple previous reports will be displayed on the canvas drawn after each subsequent reporting. Only when it is instructed to clear the display content on the display or use the eraser to erase a part of the display content on the display, the display of the corresponding touch coordinate points will be stopped.

Further, after the touch chip obtains the touch coordinates, the touch chip not only sends the touch coordinates to the timing controller, but also sends the touch coordinates to the main controller synchronously. This is because there may be a display image corresponding to the playing data that needs to be displayed on the display in the display apparatus. In this case, after the user touches and writes, the display not only needs to display the display image corresponding to the playing data, but also needs to display the content written by the user's touch, that is, superimpose the playing data and the content written by the touch to obtain the display data, and then the display obtains the corresponding display image according to the display data. The timing controller can only process the touch coordinates, and the playing data needs to be processed by the main controller. Therefore, when the picture of the playing data changes, the touch coordinates must be sent to the main controller and the timing controller to achieve the superposition of the playing data and the touch coordinates.

For example, when the user writes the Chinese character "—", the touch IC obtains the touch coordinates in sequence according to the reporting rate of 60 Hz, and the obtained touch coordinates are point A, point B, point C, point D and point E in sequence.

When a command to instruct clearing or a command to instruct erasing is not obtained, the touch IC sends the coordinate information of the point A to the timing controller after obtaining the point A. In this case, the canvas drawn by the timing controller for the first time includes the point A, and the timing controller stores the coordinate information of the point A and the thickness and color information of the brush.

The touch IC sends the coordinate information of the point B to the timing controller after obtaining the point B. In this case, the canvas drawn by the timing controller for the second time includes the point A and point B. While, the canvas drawn for the second time combined with the playing data is equivalent to the current display data, the canvas drawn for the first time combined with the playing data is equivalent to a previous frame of display data, and the timing controller stores the coordinate information of the point B and the thickness and color information of the brush.

The touch IC sends the coordinate information of the point C to the timing controller after obtaining the point C. In this case, the canvas drawn by the timing controller for the third time includes the point A, point B and point C. While, the canvas drawn for the third time combined with the playing data is equivalent to the current display data, the canvas drawn for the second time combined with the playing data is equivalent to a previous frame of display data, and the timing controller stores the coordinate information of the point C and the thickness and color information of the brush.

The touch IC sends the coordinate information of the point D to the timing controller after obtaining the point D. In this case, the canvas drawn by the timing controller for the fourth time includes the point A, point B, point C and point D. In this case, the canvas drawn for the fourth time combined with the playing data is equivalent to the current display data, while the canvas drawn for the third time combined with the playing data is equivalent to a previous frame of display data, and the timing controller stores the coordinate information of the point D and the thickness and color information of the brush.

The touch IC sends the coordinate information of the point E to the timing controller after obtaining the point E. In this case, the canvas drawn by the timing controller for the fifth time includes the point A, point B, point C, point D and point E. While, the canvas drawn for the fifth time combined with the playing data is equivalent to the current display data, the canvas drawn for the fourth time combined with the playing data is equivalent to a previous frame of display data, and the timing controller stores the coordinate information of the point E and the thickness and color information of the brush.

In the process of drawing the canvas continuously, the timing controller also performs superimposition according to the drawn canvas and the playing data to generate the display data, and then sends the display data to the display.

The display presents the corresponding display image according to the display data, wherein the touch point may be output with delay of one frame.

For example, the first frame includes the playing data and point A; the second frame includes the playing data, point A and point B; the third frame includes the playing data, point A, point B and point C; the fourth frame includes the playing data, point A, point B, point C and point D; the fifth frame includes the playing data, point A, point B, point C, point D and point E. That is, all the obtained touch coordinates will be presented in sequence on the display, to form a continuous picture to present to the user.

In the above embodiments, the process of drawing the canvas by the timing controller and the process of generating the display data are described. When the user performs a touch operation on the display, the touch chip obtains the touch coordinates continuously, and then sends the touch coordinates to the timing controller and the main controller. After obtaining the touch coordinates, the timing controller firstly stores the touch coordinates and then draws the canvas. The touch coordinates reflect the user's touch position on the display. When the touch coordinates are stored in the background, the touch coordinates are stored in the form of a matrix. In addition to displaying the user's touch content, the display also needs to display the playing data. For example, when the display apparatus is playing a TV program, the display presents the played TV program together with the user's touch content thereon if the user touches and writes on the display. The playing data is displayed in units of pixel, and there may not be a one-to-one correspondence between the pixels and the touch coordinates stored in the form of a matrix in the background. In this case, the correspondence between the touch coordinates and the pixels needs to be performed.

This process will be described below with reference to FIG. 22.

Figure 22:
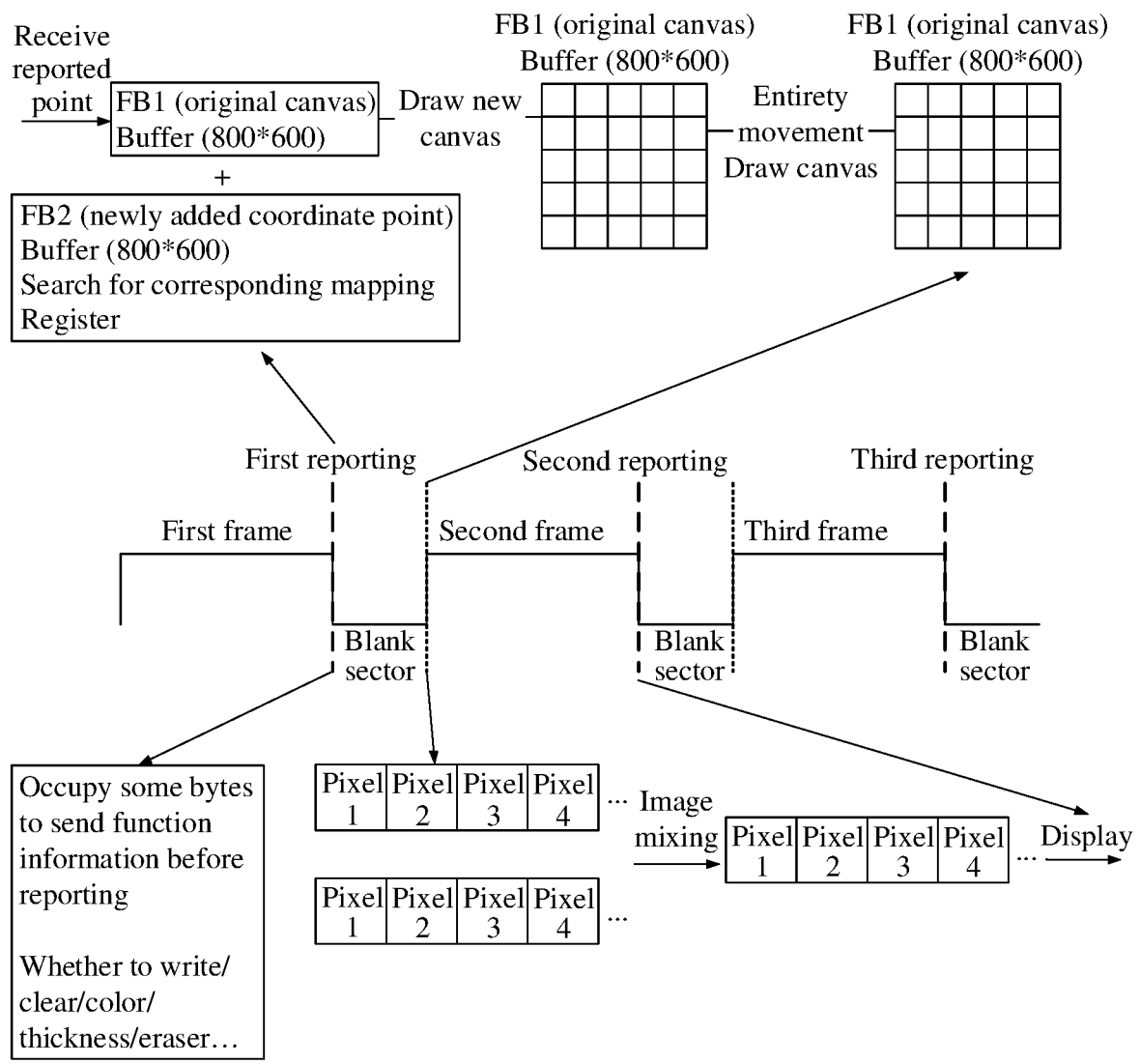
FIG. 22 is a circuit timing chart according to some embodiments of the disclosure.

FIG. 22 is a circuit timing diagram according to some embodiments of the disclosure. As shown in FIG. 22, the drawing of the canvas needs to be performed in the memory Fifo Buffer. Taking a 55-inch UD product as an example, with 16384×16384 touch layer partitions, and 3840×2160 display layer partitions.

The touch layer partitions correspond to the touch coordinate matrix stored in the background, and this matrix includes 16384 coordinates in the horizontal direction and 16384 coordinates in the vertical direction. After obtaining the touch coordinates, the touch chip sends the touch coordinates to the timing controller and the main controller. When the timing controller stores the touch coordinates, the stored touch coordinates correspond to a point in the matrix of 16384×16384.

The display layer partitions correspond to the pixels on the display, and the display includes 3840 pixel coordinates in the horizontal direction and 2160 pixel coordinates in the vertical direction. After obtaining the playing data and the touch coordinates, the timing controller needs to superimpose them.

In some embodiments, the original canvas is combined with the newly added reported points to form a new canvas, and the coordinates is converted into the pixels in the display area during the drawing process of the canvas. The superposition with the data stream (display layer) is performed at the beginning of the next frame to display the final picture.

For example, when the stored touch coordinate is one of the matrix of 16384×16384 and the resolution of the display is 3840×2160, a point in every sub-matrix of about 4*7 in this matrix corresponds to one pixel on the display. According to the position of the touch coordinates in the matrix, the pixel corresponding to the touch coordinates on the display can be known, so as to realize the superposition of the touch coordinates with the playing data to generate the display data.

Every time the timing controller receives a reported point, the timing controller will draw the canvas. For example, in FIG. 22, after a reported point is received, the FB1 (original canvas) is drawn; and after a next reported point is received, the FB2 is drawn, where the FB2 is newly added with touch coordinates relative to the FB1. After each new reported point is received, new touch coordinates will be added to the new canvas for display in sequence.

When storing the touch coordinates, the timing controller also stores the corresponding brush information, including the thickness and color of the brush.

In FIG. 22, "Pixel" represents a pixel. The image mixing shown in the lower part of FIG. 22 is the superimposition of the playing data with the touch coordinates. After the superimposition of the playing data with the touch coordinates is implemented according to the mapping relationship between touch coordinates and pixels to generate the display data, the display shows the corresponding display image according to the display data.

In the above embodiments, the display solutions for the user's touch writing are all based on the premise that the display apparatus is in the writing state. Optionally, the display apparatus may not be in the state of writing. When the display apparatus is not in the state of writing, the display apparatus does not respond to and display the users touch writing. The user can control the display apparatus to switch into writing state and switch from writing state.

For example, a writing instruction may be sent from the main controller to the timing controller, where the writing instruction is used to instruct the timing controller to generate the display data according to the touch coordinates and the display to present a corresponding display image according to the display data.

Figure 23:
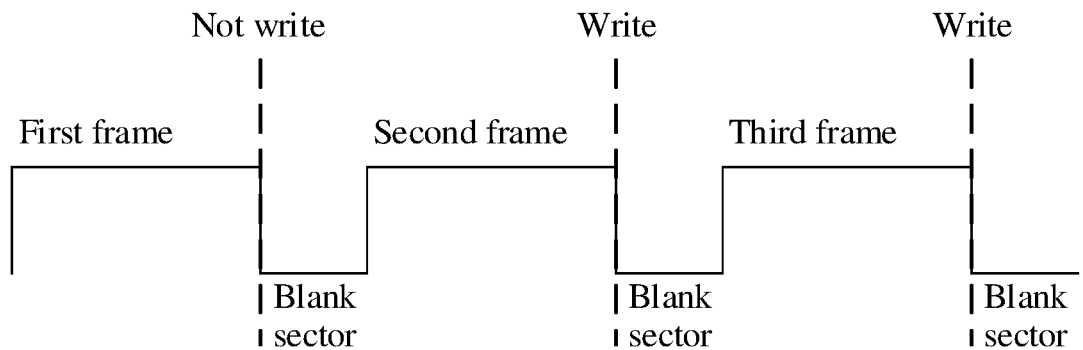
FIG. 23 is a schematic diagram of showing the writing operation according to some embodiments of the disclosure.

FIG. 23 is a schematic diagram of writing according to some embodiments of the disclosure. As shown in FIG. 23, the touch chip sends touch coordinates to the timing controller and the main controller according to a preset time interval. When the display apparatus is in the state of no writing, the touch coordinates are not displayed and responded to; only when the display apparatus is in the writing state, the user's touch and writing operation can be displayed and responded.

The writing function includes different functions such as clearing the screen, changing the color of the brush, changing the thickness of the brush, eraser, etc., where: clearing the screen means clearing all touch writing marks on the display, changing the color of the brush means adjusting the color of the touch coordinates presented on the display, changing the thickness of the brush means adjusting the thickness of the touch coordinates on the display, and the eraser is used to erase a touch writing mark on the display. When the user operates the eraser to erase a certain place, the touch writing mark at that place is removed.

The main controller can send the brush information to the timing controller, and the timing controller is further configured to receive the brush information, and generate the display data according to the brush information, touch coordinates and playing data, where the brush information is used to indicate the thickness and color of the touch coordinates in the display data.

The main controller can also send the erasing information to the timing controller, and the timing controller is further configured to receive the erasing information, and erase the display of a corresponding coordinate point in the display data according to the erasing information.

All the functions of clearing the screen, changing the color of the brush, changing the thickness of the brush and eraser in the writing function may be realized by TCON. At the beginning of the blank sector of each frame, the SOC may send the information to the TCON through the I2C command, and the TCON performs the relevant operation after receiving the information.

Whether to write is determined by the indication information sent from the SOC to the TCON. The SOC determines to perform the writing operation when entering the App "whiteboard" through detection and selecting the brush or eraser in the menu. After receiving a command to write from the SOC, the TCON performs the writing operation. The SOC needs to transmit this information to the TCON at the beginning of each frame blank according to the previous frame information.

When the screen clearing operation is required, the user can trigger an instruction on the display, and then the SOC sends the screen clearing information to the TCON. Upon receiving the screen clearing information, the TCON clears the memory information and waits for receiving an instruction again.

When it is necessary to change the color of the brush, the user can trigger an instruction on the display, and then the SOC sends the color information to the TCON. Upon receiving the color information sent from the SOC, the TCON selects the corresponding color (map) to output when drawing the canvas.

When it is necessary to change the thickness of the brush, the user can trigger an instruction on the display, and then the SOC sends the thickness information to the TCON. Upon receiving the thickness information sent from the SOC, the TCON selects the corresponding map to output when drawing the canvas.

Figure 24:
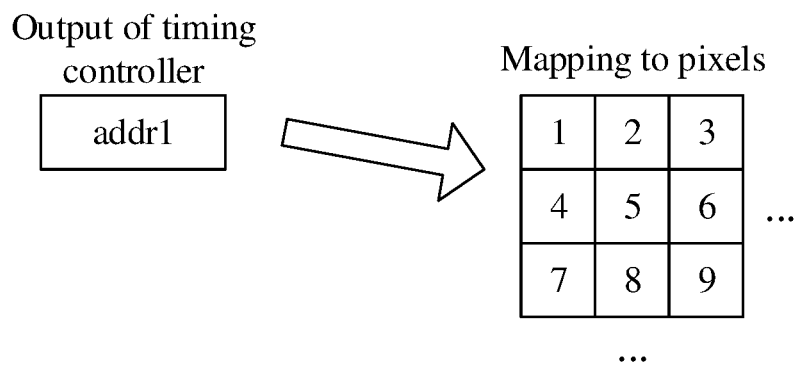
FIG. 24 illustrates a mapping of the brush thickness according to some embodiments of the disclosure.

FIG. 24 is a mapping schematic diagram of the brush thickness according to some embodiments of the disclosure. As shown in FIG. 24, after superimposing the touch coordinates with the playing data, the timing controller needs to generate the display data according to the thickness and color of the brush, and the display presents the corresponding display image according to the display data. By obtaining the thickness information sent from the SOC and determining the mapping relationship between each touch coordinate and a pixel according to the thickness information, the thickness of the brush can be changed, and the display image can be updated on the display.

The display apparatus according to the embodiments of the disclosure includes a touch chip, a timing controller and a display, where the touch chip is configured to obtain touch coordinates of a user on the display and send the touch coordinates to the timing controller; the timing controller is configured to receive the touch coordinates, generate display data according to the touch coordinates, and send the display data to the display; and the display is configured to present based on the display data. In the embodiments of the disclosure, the touch chip sends the touch coordinates directly to the timing controller upon obtaining the touch coordinates, the timing controller processes the touch coordinates, and the display displays the corresponding picture according to the display data after the display data is generated, without processing the touch coordinates by the main controller and then sending the touch coordinates to the timing controller for presenting on the display. The timing controller only needs to process the touch coordinates sent from the touch chip, and the main controller needs to process other types of data except the touch coordinates, so the timing controller directly processes the touch coordinates in the embodiments of the disclosure, which can realize real-time processing and save the step of sending the touch coordinates from the main controller to the timing controller after processing, thus reducing the touch delay, improving the fluency of the display apparatus, and further improving the user experience.

Figure 25:
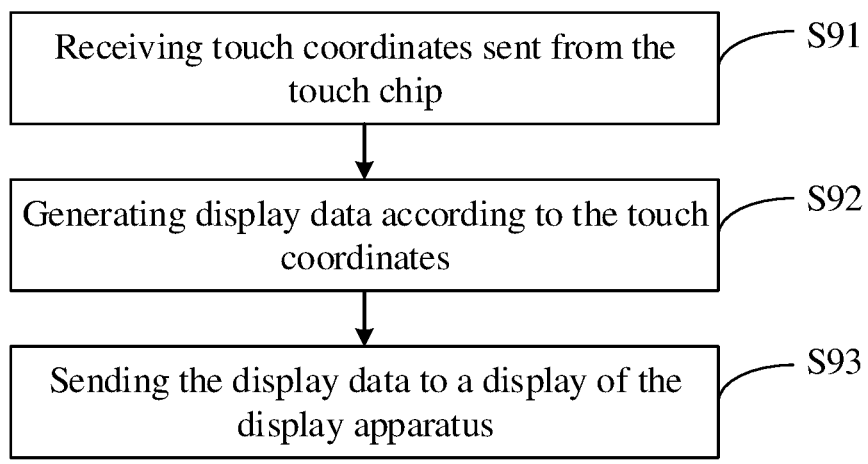
FIG. 25 is a schematic flowchart of a touch display method according to some embodiments of the disclosure.

FIG. 25 is a schematic flowchart of a touch display method for a display appparatus according to an embodiment of the disclosure, as shown in FIG. 25, including:

S91: receiving touch coordinates sent from the touch chip;

S92: generating display data according to the touch coordinates;

S93: sending the display data to a display of the display apparatus.

Figure 26:
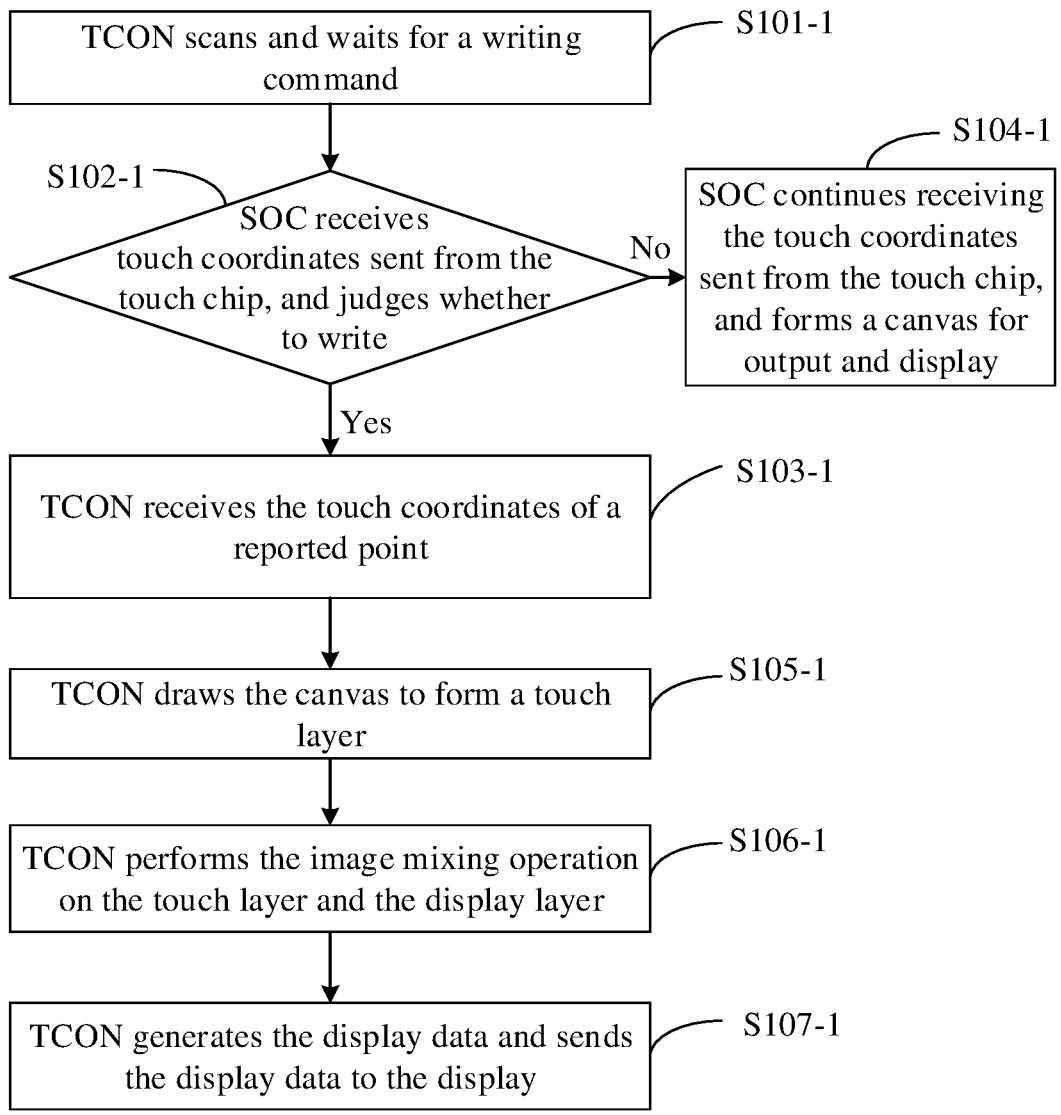
FIG. 26 is a schematic diagram of a touch display solution according to some embodiments of the disclosure.

FIG. 26 is a schematic diagram of a touch display method according to an embodiment of the disclosure, as shown in FIG. 26, including:

S101-1: TCON scans and waits for a writing command;

S102-1: SOC receives touch coordinates sent from the touch chip, and determines whether to write; if yes, the flow goes to S103-1; if not, the flow goes to S104-1;

S103-1: TCON receives the touch coordinates of a reported point;

S104-1: SOC continues receiving the touch coordinates sent from the touch chip, and forms a canvas for output and display;

S105-1: TCON draws the canvas to form a touch layer;

S106-1: TCON performs the image mixing operation on the touch layer and the display layer;

S107-1: TCON generates the display data and sends the display data to the display.

The touch display method illustrated in FIG. 25 and FIG. 26 are applied to the timing controller or the main controller in the above-mentioned embodiments. The specific execution schemes and beneficial effects may refer to the above-mentioned embodiments, and will not be repeated here.

The disclosure also provides a computer readable storage medium in which computer-executable instructions are stored. When a processor executes the computer-executable instructions, the above-mentioned transmission method is implemented.

The above-mentioned computer readable storage medium or the above-mentioned readable storage medium may be implemented by any type of volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk. The readable storage medium may be any available medium accessible to a general-purpose or special-purpose computer.

An exemplary readable storage medium is coupled to the processor so that the processor can read information from the readable storage medium and can write information into the readable storage medium. Of course, the readable storage medium may also be a component of the processor. The processor and the readable storage medium may be located in an Application Specific Integrated Circuit (ASIC for short). Of course, the processor and the readable storage medium may also exist in a device as discrete components.

The division of units is merely a logical function division. In an actual implementation, there may be other division manners, for example, a plurality of units or components may be combined or integrated into another system, or some features may be ignored or not performed. On the other hand, the displayed or discussed mutual coupling or direct coupling or communication connection may be implemented through the indirect coupling or communication connection between some interfaces, devices or units, and may be in the electrical or other forms.

The units described as individual components may or may not be physically separated, and the components displayed as units may or may not be physical units, that is, may be located in one place or may be distributed onto multiple network units. Some or all of the units may be selected according to the actual needs to achieve the objects of the solutions of the embodiments.

In addition, the functional units in each embodiment of the disclosure may be integrated into one processing unit, or each unit may exist alone physically, or two or more units may be integrated into one unit.

When the function is implemented in the form of software functional unit and sold or used as an independent product, it may be stored in a computer readable storage medium. Based on such understanding, the technical solution of the disclosure essentially or a part that contributes to the related technology or all or a part of the technical solution may be embodied in the form of software product. The computer software product is stored in a storage medium, and includes several instructions used to enable a computer device (which may be a personal computer, server, or network device, etc.) to perform all or some of the steps of the methods of various embodiments of the disclosure. The above-mentioned storage medium includes: USB flash drive, mobile hard disk, Read-Only Memory (ROM), Random Access Memory (RAM), magnetic disk or compact disc or various media that can store the program codes.

It can be understood by those ordinary skilled in the art that the implementation of all or some of the steps of the above method embodiments may be completed by the hardware related to the program instructions. The aforementioned program may be stored in a computer readable storage medium. When the program is executed, the steps including the foregoing method embodiments are performed; and the foregoing storage medium includes various media that can store program codes, such as ROM, RAM, magnetic disk, or optical disk.

Finally, it should be noted that the above embodiments are only used to illustrate but not limit the embodiments of the disclosure; although the disclosure has been illustrated in details by reference to the above embodiments, it should be understood by those ordinary skilled in the art that they can still modify the elements in the above embodiments or substitute some or all of the elements therein; and these modifications and replacements do not make the essence of the corresponding embodiments depart from the scope of the embodiments of the disclosure.

What is claimed is:

1. A display apparatus, comprising:
a touch panel, configured to receive a touch operation and comprising a touch film and a display panel configured to display an image;
a backlight module configured to provide a backlight source to the touch panel and including a backplane, a reflective sheet, a light guide plate, a optical film and a light source located on one side of the backplane;
a touch pad, configured to drive and control the touch film;
a plurality of flexible circuit boards, through which the touch film is electrically connected with the touch pad, and which are located on a same side of the touch film;
wherein the touch film comprises a plurality of sensing lines and a plurality of driving lines;
wherein the plurality of sensing lines and the plurality of driving lines are arranged on a first area of the touch film and a second area of the touch film different from the first area, and a density of the plurality of sensing lines and the plurality of driving lines in the first area is greater than a density of the plurality of sensing lines and the plurality of driving lines in the second area.

2. The display apparatus according to claim 1, wherein:
the plurality of flexible circuit boards comprise: one or more first flexible circuit boards, through which the plurality of driving lines are electrically connected with the touch pad;
one or more second flexible circuit boards, through which the plurality of sensing lines are electrically connected with the touch pad;
the one or more first flexible circuit boards and the one or more second flexible circuit boards are located on a same side of the touch film.

3. The display apparatus according to claim 2, wherein:
the one or more first flexible circuit boards and the one or more second flexible circuit boards are located at a ground-side of the display panel.

4. The display apparatus according to claim 2, wherein:
a side of the display panel is connected with a plurality of third flexible circuit boards, wherein
the plurality of third flexible circuit boards, the one or more first flexible circuit boards and the one or more second flexible circuit boards are located on a same side of the display panel, and are arranged alternatively.

5. The display apparatus according to claim 4, further comprising a source board,
wherein the source board is configured to drive and control the display panel;
the plurality of third flexible circuit boards are connected with the source board;
wherein the plurality of third flexible circuit boards extend beyond the source board.

6. The display apparatus according to claim 2, further comprising:
an adapter board, through which the first flexible circuit board or the second flexible circuit board is electrically connected with the touch pad.

7. The display apparatus according to claim 6, further comprising a flexible flat cable, wherein
one terminal of the flexible flat cable is connected with the adapter board and other terminal of the flexible flat cable is connected with the touch pad.

8. The display apparatus according to claim 2, wherein:
a quantity of the one or more second flexible circuit boards is greater than a quantity of the one or more first flexible circuit boards.

9. The display apparatus according to claim 1, further comprising:
a front housing, located at a ground-side of the display panel and configured to cover a plurality of flexible circuit boards at the ground-side of the display panel.

10. The display apparatus according to claim 2, wherein:
the plurality of driving lines are connected with the one or more first flexible circuit boards by bonding; and the plurality of sensing lines are connected with the one or more second flexible circuit boards by bonding;

the one or more first flexible circuit boards is connected with the touch pad by bonding;

and the one or more second flexible circuit boards is connected with the touch pad by bonding.

11. The display apparatus according to claim 1, wherein a width of the first area is equal to a width of the touch film and a width of the second area is equal to the width of the touch film.

12. The display apparatus according to claim 2, wherein the touch film comprises a viewing area and an active area.

13. The display apparatus according to claim 12, wherein a black matrix is disposed between the viewing area and the active area.

* * * * *